US012544757B2

(12) United States Patent
Korner et al.

(10) Patent No.: US 12,544,757 B2
(45) Date of Patent: *Feb. 10, 2026

(54) METHOD FOR PROCESSING A BIOLOGICAL SAMPLE WITH MAGNETIC PARTICLES

(71) Applicant: ROCHE MOLECULAR SYSTEMS, INC., Pleasanton, CA (US)

(72) Inventors: Stephan Korner, Rotkreuz (CH); Emad Sarofim, Rotkreuz (CH); Goran Savatic, Rotkreuz (CH); Marko Simic, Rotkreuz (CH)

(73) Assignee: ROCHE MOLECULAR SYSTEMS, INC., Pleasanton, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/740,966

(22) Filed: Jun. 12, 2024

(65) Prior Publication Data

US 2024/0326053 A1 Oct. 3, 2024

Related U.S. Application Data

(63) Continuation of application No. 16/895,533, filed on Jun. 8, 2020, now Pat. No. 12,036,552, which is a (Continued)

(30) Foreign Application Priority Data

Oct. 11, 2017 (EP) .................................... 17195977

(51) Int. Cl.

*B01L 3/00* (2006.01)
*B03C 1/28* (2006.01)

(52) U.S. Cl.

CPC ....... *B01L 3/502761* (2013.01); *B01L 3/5085* (2013.01); *B03C 1/28* (2013.01);

(Continued)

(58) Field of Classification Search

CPC .... B01L 3/502761; B01L 3/5085; B03C 1/28; B03C 1/288

(Continued)

(56) References Cited

U.S. PATENT DOCUMENTS

| | | | | |
|---|---|---|---|---|
| 12,036,552 | B2 * | 7/2024 | Korner | B03C 1/28 |
| 2002/0008053 | A1 | 1/2002 | Hansen et al. | |

(Continued)

FOREIGN PATENT DOCUMENTS

| | | | |
|---|---|---|---|
| AU | 2011202810 | B2 | 6/2013 |
| EP | 1955079 | B1 | 8/2010 |

OTHER PUBLICATIONS

"Well Positions for Microplates", ANSI-SLAS-Apr. 2002, Society for Laboratory Automation and Screening, (Oct. 13, 2011) (Year: 2011).*

(Continued)

*Primary Examiner* — Molly K Devine
(74) *Attorney, Agent, or Firm* — Charney IP Law LLC; Thomas M. Finetti

(57) ABSTRACT

The present disclosure relates to a method for isolating a biological target material from a liquid sample in a multiwell plate using magnetic particles, wherein high efficiency and low elution volumes are achieved by specific movements of the multiwell plate and a magnetic separation plate in relation to each other. Also disclosed is a pre-analytical system suitable for carrying out the method.

18 Claims, 14 Drawing Sheets

Related U.S. Application Data continuation of application No. PCT/EP2018/077376, filed on Oct. 9, 2018.

(52) U.S. Cl.
CPC .................. *B01L 2200/0668* (2013.01); *B01L 2300/0829* (2013.01); *B03C 2201/18* (2013.01); *B03C 2201/26* (2013.01)

(58) Field of Classification Search
USPC .......................................................... 422/527
See application file for complete search history.

(56) References Cited

U.S. PATENT DOCUMENTS

| | | | |
|---|---|---|---|
| 2007/0092403 | A1 | 4/2007 | Wirbisky et al. |
| 2011/0300620 | A1 | 12/2011 | Belz et al. |
| 2012/0058011 | A1 | 3/2012 | Wirbisky et al. |
| 2012/0269702 | A1 | 10/2012 | Safar et al. |

OTHER PUBLICATIONS

International Search Report and Written Opinion for PCT/EP2018/077376, dated Nov. 19, 2018.

* cited by examiner

METHOD FOR PROCESSING A BIOLOGICAL SAMPLE WITH MAGNETIC PARTICLES

CROSS-REFERENCE TO RELATED APPLICATIONS

The present application is a continuation of U.S. patent application Ser. No. 16/895,533 filed on Jun. 8, 2020, which application is a continuation of International Application No. PCT/EP2018/077376 filed on Oct. 9, 2018, which applications priority to and the benefit of the filing date of European Patent Application No. 17195977.8, filed on Oct. 11, 2017, the disclosures of which are hereby incorporated by reference herein in their entireties.

FIELD OF THE INVENTION

The present invention belongs to the field of analytical systems for conducting biological or biochemical assays. Within this field, it relates to processing of a liquid biological sample, such as a sample containing biomolecules, with the aid of magnetic particles employed in a pre-analytical system.

BACKGROUND

Processing of biological samples such as clinical samples in analytical applications often involves the use of magnetic micro- or nanoparticles, especially in the field of clinical diagnostics. Downstream analytical methods for target molecules isolated with the help of magnetic particles such as binding particles are, for example, amplification, detection and/or sequencing of nucleic acids such as RNA, DNA, mRNA (by means of PCR or other amplification techniques), mass spectrometry, ELISA or electro- or chemiluminescence assays for proteins, and the like.

Typically, the magnetic particles exhibit a surface to which a biological target material can be bound using appropriate conditions. In contrast to non-magnetic binding particles, they can be retained by magnets when withdrawing the respective supernatant during an isolation process for a biological target material, thus abolishing the need for centrifugation or comparable techniques.

Sample preparation techniques based on magnetic particles are well known in the art and appreciated for their ease of automation as well as other advantages.

However, it has proven difficult to conduct the process in small volumes and to obtain small elution volumes, as required by specific analytical or diagnostic techniques including mass spectrometry and nucleic acid sequencing. The said techniques often need high concentrations of the analyte in question, which would be difficult to achieve with large elution volumes, especially since the biological target material is in many cases not abundantly available in samples such as clinical samples, or the samples themselves may be of limited availability.

Therefore, it is important to achieve high efficiency in the processing of magnetic particles. In particular, the loss of magnetic particles throughout the sample preparation or analyte isolation process should be minimized, since every lost particle implies the loss of valuable portions of the biological material to be obtained. Moreover, magnetic particles found in the eluate may disturb down-stream processes.

Loss of magnetic particles can be caused by a variety of factors. For instance, Witt et al. (2012, Forensic Science International: Genetics, Issue 6, pp. 539-547) suggest the use of particles with an increased size such as to more efficiently recover them in the course of the process. However, as such beads display a stronger tendency to sink to the bottom of the vessel, they need to be resuspended especially during binding processes. Furthermore, such beads have a considerably lower binding capacity, and the void volume between the particles of a cluster may be large, making it difficult to fully remove a liquid from the beads.

A further challenge in the art has been to conduct the process reliably, unattended and fully automated, as well as to process several samples in parallel.

The present disclosure describes an approach that avoids such shortcomings in the art.

SUMMARY OF THE INVENTION

In a first aspect described herein, a method is described for isolating a biological target material from a liquid sample, commencing with the provision of a multiwell plate holding a liquid sample including a suspension of magnetic particles. The sample is incubated under conditions to bind the biological material to the particles, and subsequently magnets of a magnetic separation plate are introduced into corresponding recesses of the multiwell plate, thus invoking a magnetic field gradient in the wells to form a pellet of magnetic particles at an inner side wall of the respective well. Multiple pipette tips are then introduced down to the well bottom to withdraw the liquid sample without disturbing the pellet held at the wall. After an optional washing step, the magnets are retrieved from the recesses of the multiwell plate, and an elution buffer is added to the wells. The elution volume is smaller than the initial volume of the liquid sample in question in each well. Following elution of the desired biological material under suitable conditions, the magnets are reintroduced into the plate recesses, and the eluate is withdrawn from the bottom of the well by using pipette tips, while the pellet of magnetic particles is withheld at a specific height at the inner side wall of the well by a magnetic gradient. After at least one of the steps of binding, washing and eluting, the pellet of magnetic particles is collected by moving the multiwell plate and/or the magnetic separation plate relatively to each other in a vertical and lateral manner such that the pellet is caused by the magnetic field gradient to move alongside the inner wall in the direction from top to bottom of the respective well.

Also disclosed herein is a system for carrying out the above-described method.

DETAILED DESCRIPTION OF THE INVENTION

Figure 1:
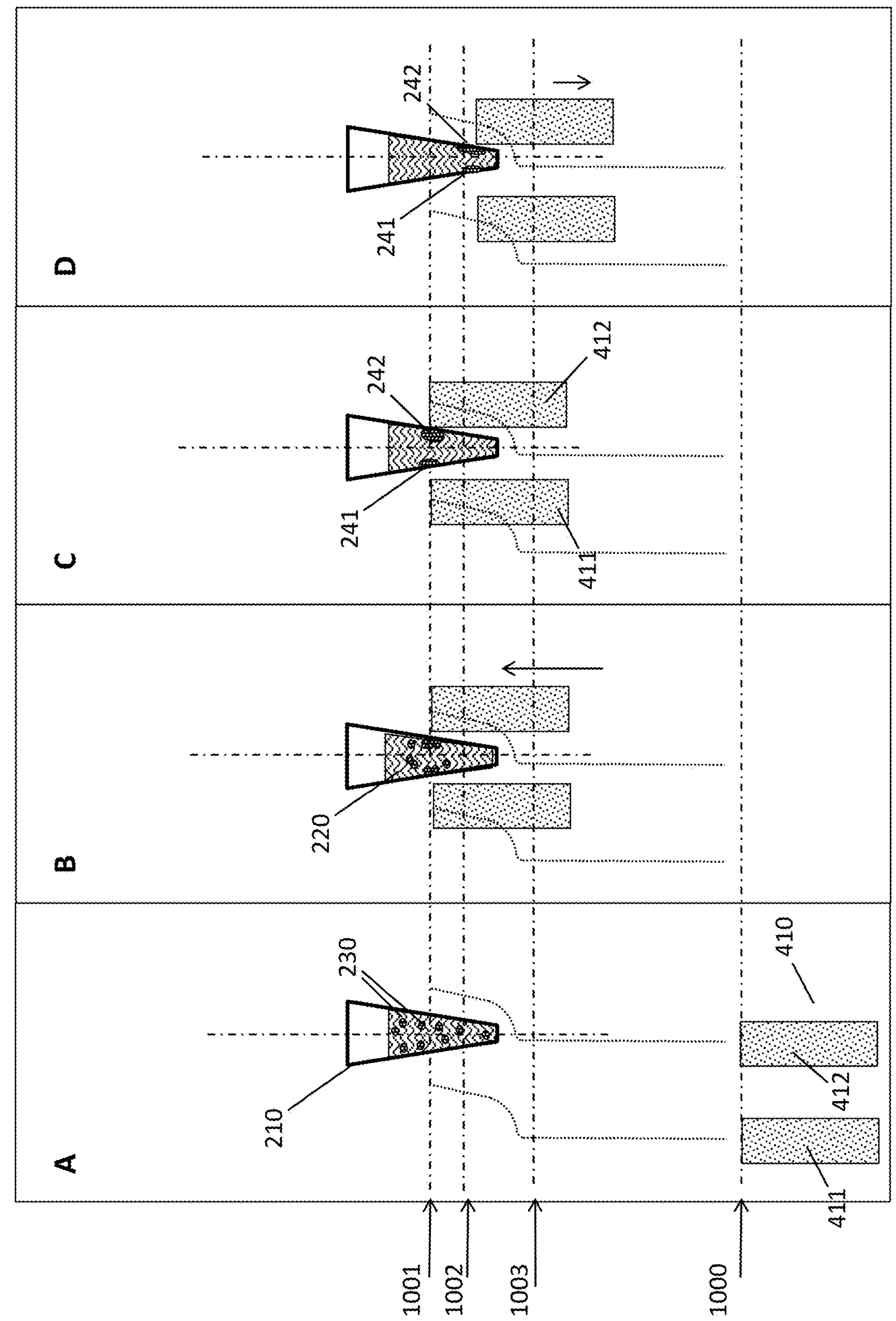
FIG. 1 shows a schematic side view of the incubation steps of the method described herein.
Figure 1:
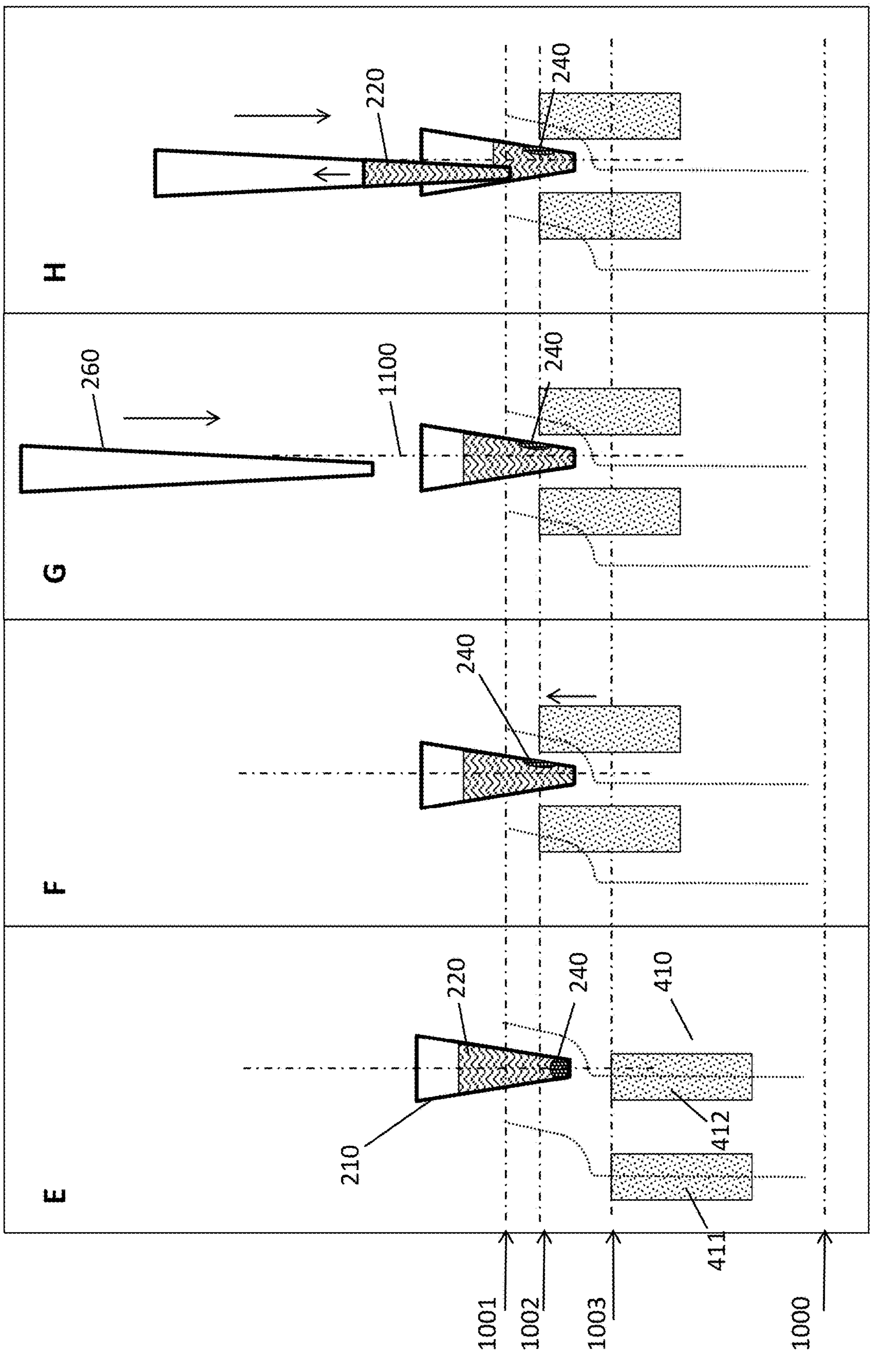
Figure 1:
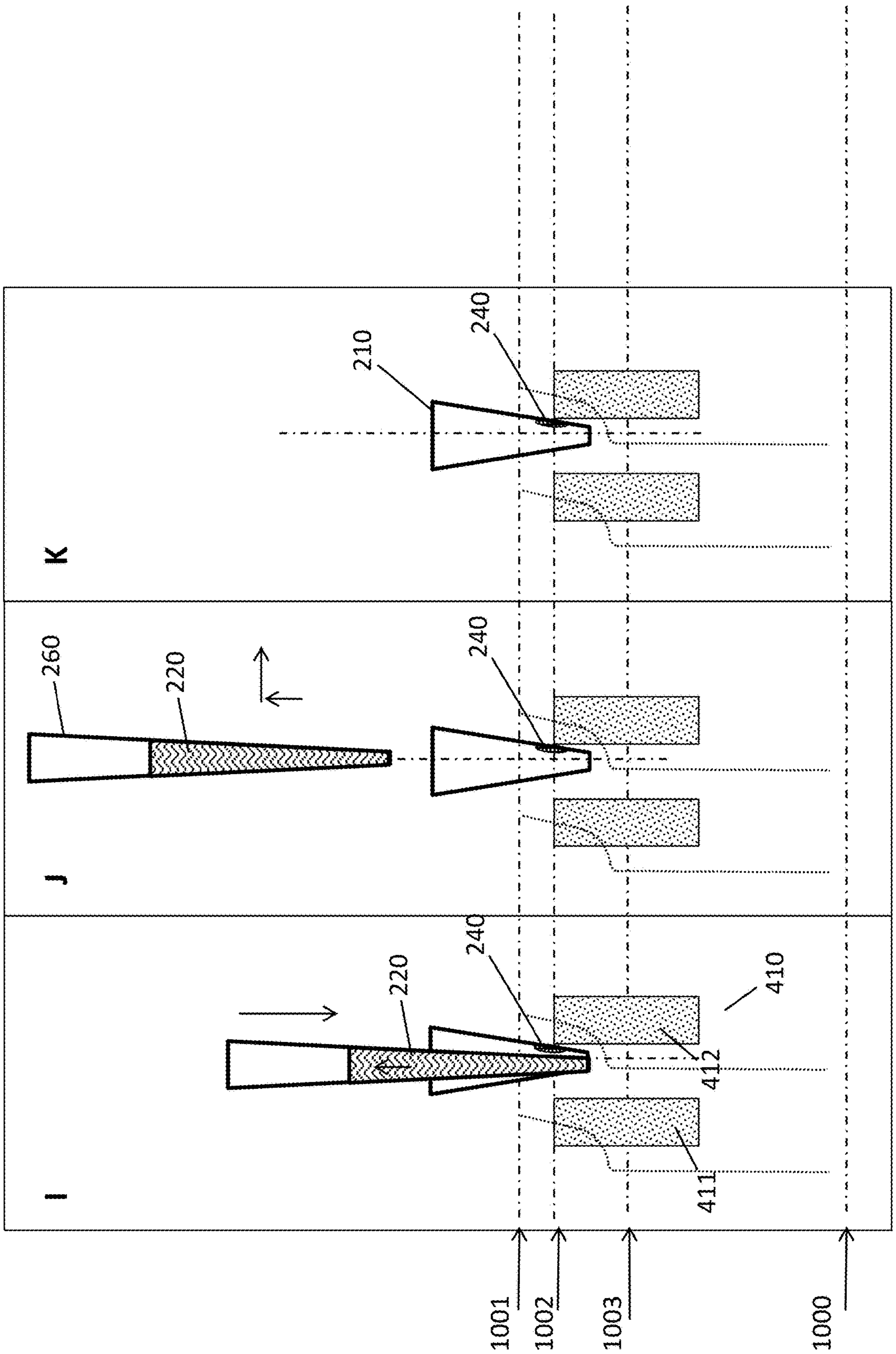

A first aspect described herein is a method for isolating a biological target material from a liquid sample, the method comprising the steps of:

a. providing a multiwell plate having a plurality of wells with an open top and a closed bottom, wherein at least a part of the plurality of wells comprises the liquid sample and a suspension of magnetic particles with a binding surface in a first liquid volume, the multiwell plate further comprising recesses in positions corresponding to a predetermined geometrical arrangement of a plurality of magnets of a magnetic separation plate;
b. incubating the liquid sample and the magnetic particles, using conditions under which the biological target material binds to the surface of the magnetic particles, in an incubation position of multiwell plate and magnetic separation plate with sufficient distance to each other such that the magnets of the magnetic separation plate do not cause a magnetic field gradient within the wells of the multiwell plate with sufficient strength to move the magnetic particles;
c. introducing the magnets of the magnetic separation plate into the recesses of the multiwell plate to reach an upper peripheral collection position, wherein each magnet is in sufficient proximity to the outside wall of a corresponding well to impose a magnetic field gradient on the inner space of said well, thereby forming a pellet of magnetic particles at the inner wall of the respective well at a first specific height;
d. moving the multiwell plate and/or the magnetic separation plate relatively to each other to reach a lower peripheral collection position, wherein the movement is carried out in a vertical and lateral manner such that the pellet is caused by the magnetic field gradient to move alongside the inner wall in the direction from top to bottom of the respective well to reach a second specific height;
e. introducing a plurality of pipette tips of a pipettor into the wells of the multiwell plate and down into sufficient proximity to the bottoms of the wells to withdraw the maximum possible amount of liquid with the pipette tips, wherein the lateral positions of the pellet and the pipette tips are spaced apart sufficiently for the pellet of magnetic particles and the pipette tip to avoid a physical interaction between one another sufficient to disturb the pellet;
f. withdrawing the liquid from the respective wells while retaining the pellet of magnetic particles by magnetic force;
g. optionally adding a washing buffer to the wells for removing undesired components from the surface of the magnetic particles while retaining the biological target material thereon, then withdrawing the liquid from the respective wells while retaining the pellet of magnetic particles by magnetic force;
h. retrieving the magnets of the magnetic separation plate from the recesses in the multiwell plate to the incubation position of multiwell plate and magnetic separation plate, and adding an elution buffer to the wells resulting in a second liquid volume, wherein the second liquid volume is smaller than the first liquid volume, and resuspending the magnetic particles therein;
i. eluting the biological target material from the magnetic particles with the elution buffer;
j. introducing the magnets of the magnetic separation plate into the recesses of the multiwell plate to reach the upper or lower peripheral collection position, wherein each magnet is in sufficient proximity to the outside wall of a corresponding well to impose a magnetic field gradient on the inner space of said well, thereby forming a pellet of magnetic particles at the inner wall of the respective well at the first or second specific height;
k. introducing the plurality of pipette tips of the pipettor into the wells of the multiwell plate and down into sufficient proximity to the bottoms of the wells to withdraw the maximum possible amount of liquid with the pipette tips, wherein the lateral positions of the pellet and the pipette tips are spaced apart sufficiently for the pellet and the pipette tip to avoid a physical interaction between one another sufficient to disturb the pellet;
l. withdrawing the eluate containing the isolated biological target material from the respective wells while retaining the pellet of magnetic particles by magnetic force.

The method described herein confers a number of advantages over the approaches used previously in the art.

In particular, the increased efficiency regarding collection of the magnetic particles allows for an improved yield of the biological material in question. Further, the assembly of the particles in a well-defined location upon collection via magnetic gradients reduces the need for relatively high elution volumes, since the vast majority of the particles can be wetted and/or suspended in a relatively low volume of the respective eluent.

As mentioned above, Witt et al. suggest using particles of greater size because they are easier and thus more efficiently to collect than smaller particles such as nanoparticles.

Another disadvantage of larger magnetic particles is the faster sedimentation in suspension liquids used for sample preparation, since-when using comparable materials-larger particles correlate with a larger mass. However, in order to facilitate efficient and reproducible chemical reactions, the magnetic particles need to be maintained evenly distributed in the respective liquid matrix, which is typically achieved by repeated/periodical or even continuous resuspension by means like shaking, rotating, aspirating/dispensing, or the like. Such resuspension measures often interfere with other interventions, such that longer intervals between individual resuspension measures are advantageous.

The method disclosed herein provides a means for efficient particle collection irrespective of the size of the magnetic particles in question. Hence, even nanobeads with a correspondingly low sedimentation coefficient may be employed.

The sedimentation coefficient s of a particle is used to characterize its behavior in sedimentation processes, be it centrifugation with a specific acceleration a, or "mere" gravitation in which the acceleration a corresponds to the gravitational constant g. The sedimentation coefficient is defined as the ratio of a particle's sedimentation velocity to the acceleration that is applied to it (causing the sedimentation).

TERMS

"Biological target material" or "biological material," in the sense of this disclosure, comprises all kinds of biological molecules, for example proteins or nucleic acids, but also other molecules occurring in nature or being derivatives or synthetic analogues or variants thereof. Furthermore, the term "biological material" comprises viruses and eukaryotic and prokaryotic cells. In some embodiments, the biological target material is nucleic acids such as e.g. DNA, RNA or PNA. The DNA can be e.g. viral DNA, genomic DNA or plasmid DNA. The biological target material can be native or modified. Native biological material is not irreversibly altered as compared the respective naturally occurring biological material, such as e.g. DNA or RNA isolated from organisms. Modified biological material comprises e.g. biotinylated molecules such as nucleic acids or proteins.

As used herein, the term "liquid sample" refers to a liquid material that may potentially contain an analyte of interest. In embodiments where the "liquid sample" is a "liquid biological sample", the sample can be derived from any biological source, such as a physiological fluid, including blood, saliva, ocular lens fluid, cerebrospinal fluid, sweat, urine, stool, semen, vaginal fluid, milk, ascites fluid, mucous, synovial fluid, peritoneal fluid, amniotic fluid, tissue, cultured cells, or the like. The test sample can be pretreated prior to use, such as preparing plasma from blood, diluting viscous fluids or diluting in general, lysis or the like. Methods of treatment can involve filtration, distillation, concentration, inactivation of interfering components, and the addition of reagents. A biological sample may be used directly as obtained from the source or used following a pretreatment to modify the character of the sample. In some embodiments, an initially solid or semi-solid biological material is rendered liquid by dissolving or suspending it with a suitable liquid medium. In some embodiments, the biological sample is suspected to contain a certain antigen or nucleic acid.

The "magnetic particles" disclosed herein may be particulate material such as beads including nanobeads, or the like. In some embodiments, they are analyte binding particles for binding specific biological targets which may, for example, be molecules, cells or viruses. In those embodiments, the particles may have surfaces coated with specific or unspecific binding molecules, such as nucleic acid capture probes, oligo- or poly (dT)-strands for binding mRNA, protein A for binding the Fc parts of immunoglobulins, Fab fragments of antibodies for binding specific proteins, nickel for binding histidine tags, streptavidin or biotin, integrins, adhesins, or other cell-surface molecules, or the like. In some embodiments, the biological target molecules are cell surface molecules, such that specific cells may be captured by the analyte binding particles. For example, for blood samples, suitable antibodies specifically binding to cell surface antigens of leucocytes, erythrocytes, monocytes are known to people skilled in the art, for example, CD2/CD3 for T cells, CD14 for monocytes, CD15 for granulocytes and monocytes, CD16 for macrophages, CD36 for platelets, monocytes and macrophages, CD45 for leucocytes. In further embodiments, the analyte binding particles have a metal-oxide or silica surface. Silicon dioxide surfaces such as glass surfaces may be used to bind nucleic acids in the presence of chaotropic agents. Magnetic particles especially useful in the context disclosed herein include the ones taught in EP 2916327 (nanobeads) or EP 1281714. As described above, nanobeads such as the ones disclosed in EP 2916327 are of special advantage due to their physical properties, including the relatively low sedimentation coefficient resulting in a low sedimentation speed. While the methods and devices disclosed herein can be carried out with paramagnetic, superparamagnetic, ferro- or ferrimagnetic particles, all of which are parts of embodiments of the present disclosure, the particles of EP 2916327 are ferrimagnetic. More precisely, they are monodisperse silanized ferrimagnetic iron oxide particles for independent generic nucleic acid binding, the particles having the following characteristics: A core comprising an inner layer comprising $Fe_3O_4$ and an outer layer comprising $Fe_2O_3$, a coating, wherein the coating comprises silica and silicates from sodium silicate precipitation, a sedimentation speed in pure water of less than 60 μm/s, and no significant iron bleeding occurs on the particles in 1M HCl for at least 60 min. In some embodiments, the magnetic particles have a mean diameter of 50 nm to 50 μm, or of 100 nm to 25 μm, or of 500 nm to 5 μm. In a specific embodiment, the magnetic particles have a mean diameter of about 1 μm.

In one embodiment, the difference in size of monodisperse silanized ferrimagnetic iron oxide particles is in average smaller than 5%. In a specific embodiment, the size of the particles has a value of n, wherein n is 20 nm to 600 nm. In a more specific embodiment, the size of the particles has a value of n, wherein n is 100 nm. In a specific embodiment, the diameter of the particles has a value of n, wherein n is 100 nm. The size of the particles of one certain batch can be varied by adjusting the concentration of iron (II) salt in the liquid glycol. This however has to be understood that the size of the silanized ferrimagnetic iron oxide particles of one certain batch is essentially the same for all particles within that batch. Essentially the same size of the particles has to be interpreted in the context of this description such that the difference in size of the particles is in average smaller than 5%.

In the context described herein, a "multiwell plate" constitutes an essentially flat plate comprising a multitude of reaction chambers in the form of wells or cavities which are used as test tubes for samples to be subjected to biological or chemical assays, wherein the multiwell plate can be made from any suitable kind of available material, such as glass, plastics, quartz, or silicon and typically provides 6, 24, 48, 96, 384, 1536 or even more sample wells which are often arranged in an mxn pattern (with m and n being positive integers), for instance, a 2×3 rectangular matrix. In cases where the multiwell plate complies with ANSI/SLAS (previously known as SBS) standards, they may be directly used in or with equally standardized devices and systems, such as multipipettors, magnetic plates, optical analyzers, and the like. The wells of a multiwell plate may be chemically inert on the inside, such that they do not interfere with the analytical reactions taking place within. In other embodiments, they may be coated with binding molecules such as biomolecules. Examples for biomolecules that may act, for instance, as capture molecules for binding either a target nucleic acid or other nucleic acids, include sequence-specific nucleic acid capture probes, such as DNA or LNA (Locked Nucleic Acid) probes. Another example would be streptavidin for interaction with a biotin tag at the target nucleic acid. Multiwell plates useful in the context described herein may have wells with diameters or wrench sizes—measured at the well opening which may, for example, be round, polygonal such as hexagonal, or the like—in the milli- to centimeter range, for example from 1 mm to 5 cm, or from 2.5 mm to 2.5 cm, or from 5 mm to 1.5 cm, or any combination of these ranges. In some embodiments, the wells have a diameter or wrench size of about 1 cm. In the frequently used m×n arrangement, with m denoting a vertical and n denoting a horizontal position, the distance or spacing between two wells in an m- or n-position may be between 4.5 and 18 mm, or between 7 and 12 mm, or about 9 mm. In the case of standard SBS 96-well plates, the distance in both m- and n-direction is 9 mm. In other embodiments, it may be the case that the distance in the m- and the distance in the n-direction are different from each other.

Multiwell plates as described herein may comprise their wells in an optically transparent area. Suitable materials conferring high optical transparency and a low level of autofluorescence include, for instance, glass, plastics, quartz, silicon, or the like. In some embodiments, the material is a cyclic olefin polymer (COP) or copolymer (COC). Other suitable materials are known to the person skilled in the art. In some embodiments, the entire multiwell plate is made of the same optically transparent material. In other embodiments, a non-transparent area, for example, towards the edges of the multiwell plate, may be made of a different material such as a more robust material for handling and protection purposes or the like.

For the purposes of the methods and devices disclosed herein, the multiwell plate comprises recesses in positions corresponding to a predetermined geometrical arrangement of a plurality of magnets. Advantageously, the recesses may be formed on the face of the plate opposite from the wells. For instance, a recess may be located in the center of four wells arranged in an mxn pattern, but on the opposing side. Thus, the magnet-especially in embodiments where the magnet has a cuboidal, rod- or pin-like shape—can be introduced into the recess and thereby positioned in close proximity of the four wells surrounding it, hence imposing a magnetic gradient on the wells and their contents.

A "magnetic separation plate" is a device useful for the separation of magnetic particles. It comprises a "support plate" and magnets, wherein the "support plate" is typically an essentially flat device for bearing and holding the magnets in a defined position which is usually perpendicular to the support plate. Said plate can be made of one or more parts and different materials such as metal or plastic. In an embodiment, the plate is made of metal. The support plate may comprise an upper and a lower plate fastened to each other.

In some embodiments, the magnets are essentially pin- or rod-shaped magnetic or magnetizable structures. The length of such magnetic pins or rods can be 2-100 mm, or 15-50 mm. Their diameter can be 1-20 mm, or 2-6 mm. In further embodiments, the magnets are essentially cuboidal. In more specific embodiments, these cuboids stretch along the x- or y-axis of a magnetic separation plate with dimensions corresponding to a multiwell plate having an SBS format. Correspondingly, such cuboids may have a length of about 7.5 cm (in y-direction), or about 12 cm (in x-direction). The height may be between about 5 mm to 10 mm. In embodiments where the multiwell plate is a standard SBS 96-well plate, as shown in the Figures, then the width of a cuboidal magnet may be between 2 and 3 mm, such that they fit into the recesses between the wells, with sufficient lateral clearance to perform a lateral movement relative to the multiwell plate.

In the absence of external forces acting on the magnets, the angle between the magnets and the support plate can be essentially a right angle. In an embodiment, the angle is between 8° and 100°, or between 85° and 95°, or about 90°.

A "predetermined geometrical arrangement" in the context of the present disclosure means a defined spatial and directional relation between elements of a group of physical objects such as magnets or corresponding recesses.

A "pipettor" is a device allowing for the automatic withdrawing and/or dispensing of volumes of fluids such as for fluid transfer or sip and spit mixing. In the context described herein, these fluids include the liquid biological sample, reagents used for processing the liquid biological sample, cleaning solutions, dilution buffers, processed liquids, liquids containing a processed analyte, or the like. The liquids may be withdrawn and dispensed from any of the following positions/vessels: sample tubes, intermediate process tubes, reagent containers, waste containers or positions, tip-wash-stations, output vessels, reaction tubes, and the like. In particular, the pipettor may be used for the dispensing of a fluid biological sample into the wells of the multiwell plate described herein or withdrawing it therefrom. The pipettor is in some embodiments driven by a pneumatic or hydraulic system. As a hydraulic liquid the pipettor may in some embodiments use water or a commonly used reagent.

The pipettor may comprise one or more reusable washable needles such as a steel needle or use disposable pipette tips. The pipettor may be mounted to a transfer head that can be moved in one or two directions of travel in a plane, for example, with guiding rails and a third direction of travel orthogonal to the plane, with a spindle drive or the like. For instance, the pipettor may be moved horizontally between a primary sample tube and the multiwell plate or another target position, and vertically in order to withdraw or dispense the liquid biological sample or other liquids. The pipettor may be integrated, i.e. built in a work cell or be a module of a system operatively connected to a work cell. The position and operation (including parameters such as volume, flow rate, direction of flow, or the like) of the pipettor are controlled by a control unit, as described herein.

A "control unit" controls an automated system in a way that the necessary steps for the processing protocols are conducted by the automated system. That means the control unit may, for example, instruct the automated system to conduct certain pipetting steps with a pipettor to mix the liquid biological sample with reagents, or the control unit controls the automated system to incubate the biological sample or reagents or mixtures of both for a certain time at a certain temperature, or the control unit controls the precise movements of the magnetic separation plate, and/or the multiwell plate, and/or the pipettor described herein, or other movements or related parameters. The control unit may receive information from a data management unit (DMU) regarding which steps need to be performed with a certain sample. In some embodiments, the control unit might be integral with the data management unit or may be embodied by a common hardware. The control unit may, for instance, be embodied as a programmable logic controller running a computer-readable program provided with instructions to perform operations in accordance with a process operation plan. In particular, the control unit may include a scheduler, for executing a sequence of steps such as the movements described above within a predefined time. The control unit may further determine the order of samples to be processed according to the assay type, urgency, and the like. The control unit may also receive data from a detection unit related to a measurement of parameter of the sample.

A "data management unit" is a computing unit for storing and managing data. This may involve data relating to the liquid sample to be processed by the automated system, or data relating to the steps to be carried out within the rotatable vessel. The data management unit may be connected to an LIS (laboratory information system) and/or an HIS (hospital information system). The data management unit (DMU) can be a unit within or co-located with the automated system it interacts with. It may be part of the control unit. Alternatively, the DMU may be a unit remotely located from the automated system. For instance, it may be embodied in a computer connected via a network to the automated system.

A "washing buffer" is a liquid designed to remove undesired components, especially in a purification procedure. Such buffers are well known in the art. The washing buffer is suited to wash the magnetic particles in order to separate the immobilized analyte from any unwanted components. Often the washing buffer or other solutions are provided as stock solutions which have to be diluted before use. The washing buffer may, for example, contain ethanol and/or chaotropic agents in a buffered solution or solutions with an acidic pH without ethanol and/or chaotropic agents as described above.

An "elution buffer" is a suitable liquid for separating biological target material from a solid support to which it is bound, such as the magnetic particles used in the method described herein. Such a liquid may e.g. be distilled or deionized water or aqueous salt solutions, such as e.g. Tris buffers like Tris HCl, or HEPES, or other suitable buffers known to the skilled artisan. The pH value of such an elution buffer is preferably alkaline or neutral if the biological target material is a nucleic acid. Said elution buffer may contain further components such as preserving agents like e.g. chelators like EDTA, which stabilizes the isolated biological target material such as e.g. nucleic acids by inactivation of degrading enzymes. In some embodiments, elution buffers like nucleic acid elution buffers have a low salt concentration, such as e.g. 0.1 M or lower.

As mentioned above, one of the advantages of the methods and devices described herein is obtaining relatively high amounts of isolated biological target material in a small liquid volume, meaning a high concentration of the analyte in question as required for a variety of important analytical techniques.

Therefore, in some embodiments, the volume of the elution buffer used in step h) of the method described herein is from 1 μl to 100 μl, or from 5 μl to 50 μl, or from 10 μl to 35 μl, or about 20 μl.

In some embodiments of the method disclosed herein, a plurality of magnetic particles is formed in step c. by imposing the magnetic field gradient. It may be of advantage to unify these multiple pellets in order to conduct the method described herein in a more well-defined manner.

For this purpose, step d. of the method described herein consists, in some embodiments, of the following sub-steps:

I. moving the multiwell plate and/or the magnetic separation plate relatively to each other to reach a central collection position, wherein the movement is carried out in a vertical and lateral manner such that the pellets are caused by the magnetic field gradient to move alongside the inner wall in the direction from top to bottom of the respective well to be pooled at the well bottom to form a single pellet;

II. moving the multiwell plate and/or the magnetic separation plate relatively to each other to reach a lower peripheral collection position, wherein the movement is carried out in a vertical and lateral manner such that the pellets are caused by the magnetic field gradient to move alongside the inner wall in the direction from bottom to top of the respective well to reach a second specific height.

In essence, the method described herein comprises the following sequence of steps in such embodiments:

a. providing a multiwell plate having a plurality of wells with an open top and a closed bottom, wherein at least a part of the plurality of wells comprises the liquid sample and a suspension of magnetic particles with a binding surface in a first liquid volume, the multiwell plate further comprising recesses in positions corresponding to a predetermined geometrical arrangement of a plurality of magnets of a magnetic separation plate;

b. incubating the liquid sample and the magnetic particles, using conditions under which the biological target material binds to the surface of the magnetic particles, in an incubation position of multiwell plate and magnetic separation plate with sufficient distance to each other such that the magnets of the magnetic separation plate do not cause a magnetic field gradient within the wells of the multiwell plate with sufficient strength to move the magnetic particles;

c. introducing the magnets of the magnetic separation plate into the recesses of the multiwell plate to reach an upper peripheral collection position, wherein each magnet is in sufficient proximity to the outside wall of a corresponding well to impose a magnetic field gradient on the inner space of said well, thereby forming a pellet of magnetic particles at the inner wall of the respective well at a first specific height;

d. moving the multiwell plate and/or the magnetic separation plate relatively to each other to reach a central collection position, wherein the movement is carried out in a vertical and lateral manner such that the pellets are caused by the magnetic field gradient to move alongside the inner wall in the direction from top to bottom of the respective well to be pooled at the well bottom;

and moving the multiwell plate and/or the magnetic separation plate relatively to each other to reach a lower peripheral collection position, wherein the movement is carried out in a vertical and lateral manner such that the pellets are caused by the magnetic field gradient to move alongside the inner wall in the direction from bottom to top of the respective well to reach a second specific height;

e. introducing a plurality of pipette tips of a pipettor into the wells of the multiwell plate and down into sufficient proximity to the bottoms of the wells to withdraw the maximum possible amount of liquid with the pipette tips, wherein the lateral positions of the pellet and the pipette tips are spaced apart sufficiently for the pellet of magnetic particles and the pipette tip to avoid a physical interaction between one another sufficient to disturb the pellet;

f. withdrawing the liquid from the respective wells while retaining the pellet of magnetic particles by magnetic force;

g. optionally adding a washing buffer to the wells for removing undesired components from the surface of the magnetic particles while retaining the biological target material thereon, then withdrawing the liquid from the respective wells while retaining the pellet of magnetic particles by magnetic force;

h. retrieving the magnets of the magnetic separation plate from the recesses in the multiwell plate to the incubation position of multiwell plate and magnetic separation plate, and adding an elution buffer to the wells resulting in a second liquid volume, wherein the second liquid volume is smaller than the first liquid volume, and resuspending the magnetic particles therein;

i. eluting the biological target material from the magnetic particles with the elution buffer;

j. introducing the magnets of the magnetic separation plate into the recesses of the multiwell plate to reach the upper or lower peripheral collection position, wherein each magnet is in sufficient proximity to the outside wall of a corresponding well to impose a magnetic field gradient on the inner space of said well, thereby forming a pellet of magnetic particles at the inner wall of the respective well at the first or second specific height;

k. introducing the plurality of pipette tips of the pipettor into the wells of the multiwell plate and down into sufficient proximity to the bottoms of the wells to withdraw the maximum possible amount of liquid with the pipette tips, wherein the lateral positions of the pellet and the pipette tips are spaced apart sufficiently for the pellet and the pipette tip to avoid a physical interaction between one another sufficient to disturb the pellet;

l. withdrawing the eluate containing the isolated biological target material from the respective wells while retaining the pellet of magnetic particles by magnetic force.

In order to benefit from the pooling of multiple pellets, if present, such a specific step d. may in some embodiments be repeated subsequently to step g. and/or step j of the method disclosed herein.

Another aspect of the present disclosure is a pre-analytical system for isolating a biological target material from a liquid sample, the pre-analytical system comprising the elements of:

a multiwell plate having a plurality of wells with an open top and a closed bottom, wherein at least a part of the plurality of wells comprises the liquid sample and a suspension of magnetic particles with a binding surface in a first liquid volume, the multiwell plate further comprising recesses in positions corresponding to a predetermined geometrical arrangement of a plurality of magnets of a magnetic separation plate;

a magnetic separation device comprising a guiding screen and the magnetic separation plate, the guiding screen being essentially perpendicular to the multiwell plate and/or to the magnetic separation plate and having guiding rails for guiding a movement of the multiwell plate and/or the magnetic separation plate relatively to each other, wherein the movement is carried out in a vertical and lateral manner such that a pellet of the magnetic particles is caused by the magnetic field gradient to move alongside the inner wall of a well of the multiwell plate.

The pre-analytical system can be advantageously used for carrying out the method disclosed herein.

In some embodiments, the magnetic separation device comprises on its upper face a frame for receiving the multiwell plate. In a more specific embodiment, the guiding screen is physically connected to the frame.

In a specific embodiment, the multiwell plate has dimensions according to the standard SBS format. Among other advantages, this embodiment facilitates the use of inexpensive off-the-shelf consumables for the method described herein and, in the system, described herein.

All other specific embodiments of the method disclosed herein also apply to the pre-analytical system disclosed herein.

EXEMPLARY EMBODIMENTS

The following Examples are meant to illustrate specific embodiments of the method and pre-analytical system disclosed herein, while they are not limiting.

The schematic drawing of FIG. 1 depicts a cross-sectional side view of an embodiment of the method described herein. For the sake of clarity, one well (210) of a multiwell plate (200, not shown) is depicted as an independent vessel interacting with two cuboid-shaped magnets (411, 412) comprised by a magnetic separation plate (400, not shown). The magnetic particles (230) in the shown embodiment are magnetic beads, such as magnetic glass beads, magnetic beads with functionalized surfaces, or the like. The images shown in FIGS. 1A-K represent steps of the method disclosed herein.

FIG. 1A shows the magnets and the well (210) in the incubation position (1000), where the magnet (410)—in the depicted embodiment constituted by the two individual magnets (411, 412) mentioned above—is located at a sufficient distance from the well (210) such that the magnetic beads (230) present in the liquid sample (220) are not significantly under the influence of the magnet, i.e., the magnetic field gradient imposed on the well is not strong enough to move the magnetic beads (230). It is to be understood that the method described herein can also be carried out in embodiments where the magnet (410) is only a single magnet. For instance, with regard to the present figure, the method disclosed herein could be performed with one of the magnets (411, 412) alone. The incubation position (1000) is mainly used during binding, washing or eluting, where the beads (230) need to be homogeneously suspended in the liquid sample (220) or the washing buffer or the elution buffer, respectively.

FIG. 1B depicts the upper peripheral collection position (1001) in which the magnets (411, 412) are sufficiently close to the well (210) of the multiwell plate (200) in order to attract the magnetic beads (230) to the wall of the well (210) in a cluster of beads (230). In the depicted case several magnets (411, 412) attract several clusters (241, 242) of beads per well (210). For the sake of illustration, the line (1001) represents the respective upper ends of the magnets (411, 412), coinciding with a first specific height of the well (210) whereto the magnetic particles (230) are attracted by the magnetic field gradient. This upper peripheral collection position (1001) is mainly used for fast and efficient separation the suspended magnetic beads (230). It may be about at half height of the processing volume, or at +/−25% thereof. The arrow pointing upwards indicates the movement of the magnets (411, 412) in relation to the well (210). It can be seen that clusters (241, 242) of magnetic beads (230) are beginning to form at the sites where the magnetic field gradient imposed by the magnets (411, 412) is strongest. This formation at the inner well walls is concluded in FIG. 1C.

The downward movement of the magnets (411, 412) in relation to the well (210) is shown in FIG. 1D. As represented by the curved dotted lines, this movement has both a lateral and a vertical component, thereby causing the clusters (230), which can also be referred to as pellets, to slide along the inner well wall in the direction from the top to the bottom of the well (210). While the movement, in a preferred embodiment, ends in the lower peripheral collection position (1002), the embodiment displayed in the present FIG. 1D shows further transport of the pellets (241, 242) towards the bottom of the well (210) in order to pool the individual pellets (241, 242).

This pooling is displayed in FIG. 1E where magnets (411, 412) and well (210) have been moved to reach a central collection positon (1003), where the right-hand magnet (412) is essentially aligned centrally below the well (210) of the multiwell plate, in sufficient proximity to the well (210) to attract the beads to the bottom of the well (210). Thus, in cases like the one depicted here with beads (230) present in several clusters, all clusters are pooled into a single pellet (240) at the bottom of the well (210). From here, the unified pellet is transported upwards again along the inner well wall by the corresponding movement of magnets (411, 412) and wells (210) to each other as indicated by the arrow shown in FIG. 1F.

FIG. 1F represents the lower peripheral collection positon (1002), where the magnets (411,412) are very close to the processing vessel (210), thus attracting the magnetics beads (230) to the wall of the well (210) in the unified pellet (240). The position (1002) is below (1001), wherein the dotted line (1002) marks the second specific height to which the pellet (240) is moved by the magnetic field gradient, thus representing said lower peripheral collection positon (1002). It is to be understood that this lower peripheral collection position (1002) can also be reached directly from the upper peripheral collection position (1001)—depicted in FIG. 1C—by moving the magnets (411, 412) downwards, wherein the movement has both a vertical and a lateral component, and thereby sliding the pellet (240) along the wall of the well (210) to the position shown in present FIG. 1F. This direct movement is especially favorable when there is no formation of multiple clusters of beads to be expected, such that no pooling is necessary, because only one pellet (240) is formed. Generally, the lower peripheral collection position (1002) is mainly used to attract the magnetic beads (230) in a small liquid volume, for example, used after a target material (900) has been eluted to a small (er) processing liquid (220), such as an elution buffer. The position of the pellet (240) is above the bottom of the vessel and typically below the upper level of the processing liquid (220).

In FIG. 1G, the imminent introduction of a pipette tip (260) into the open top of the well (210) is depicted. Its movement in relation to the well (210) is indicated by the downwards-pointing arrow to the right-hand side of the pipette tip (260). It can be seen that the lateral position of pipette tip (260) is slightly shifted towards the left of the center axis (1100) passing through the bottom of the tapered well (210), whereas the pellet (240) in the depicted lower peripheral collection position (1002) is located to the right of the center axis (1100) at the inner wall of the well (210).

Upon introduction of the pipette tip (260) into the well (210) as shown in FIG. 1H, the pipette tip (260) starts aspirating the liquid (220) from the well (210), indicated by the upwards-pointing arrow within the tip (260). In other embodiments, the aspiration does not begin until the tip (260) has reached its (lowermost) end position. In some embodiments, the liquid aspiration commences upon contact of the pipette tip (260) with the liquid surface, which may be monitored by liquid level detection as know by the skilled person. Such liquid level detection (LLD) may, for example, comprise capacitance measurements, resistive or magnetoresistive measurements, ultrasonic, optical, or other suitable detection means, or any combination thereof.

The lowermost end position of the pipette tip (260) has been reached in FIG. 1I, and the liquid aspiration is concluded. As can be seen in the depiction, the liquid (220) has been withdrawn through the pipette tip (260) to a maximum extent. The lateral positions of the pellet (240) and the pipette tip (260) are spaced apart sufficiently for the pellet (240) and the pipette tip (260) to avoid a physical interaction between one another sufficient to disturb the pellet (240).

The pipette tip (260) is removed from the well (210) in FIG. 1J and the removed liquid-which may also be termed supernatant—is discarded to a suitable waste container (not shown), while the pellet (240) remains in place (FIG. 1K) and is ready for further processing. It can be seen that the arrangement of well (210) and magnets (411, 412) remains in the lower peripheral collection position (1002) for the entire aspiration procedure from FIG. 1G through FIG. 1J.

Figure 2:
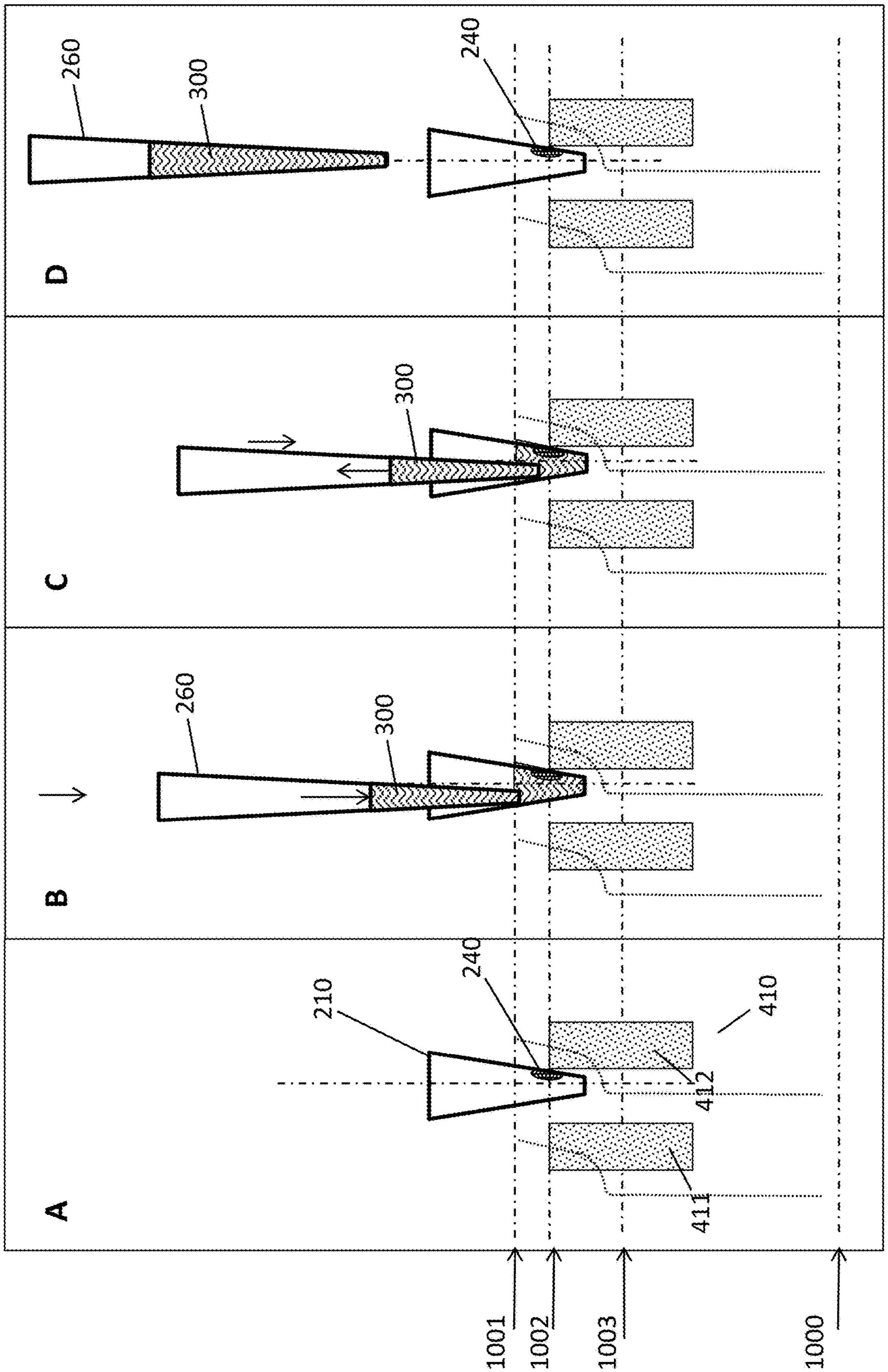
FIG. 2 schematically depicts the optional washing steps of the method described herein.

The pictures shown in FIG. 2 illustrate a sequence of optional washing steps according to an embodiment of the method described herein. With the pellet (240) at the inner wall of the well (210) kept in place by the magnet (412) in the lower peripheral collection position, for instance, following the incubation and aspiration sequence shown in FIG. 1, the current depiction starts with FIG. 2A.

A pipette tip (260) is introduced into the well (210) in FIG. 2B, wherein the lateral positions of the pellet (240) and the pipette tip (260) are spaced apart sufficiently for the pellet (240) and the pipette tip (260) to avoid a physical interaction between one another sufficient to disturb the pellet (240). As symbolized by the downward-pointing arrow within the pipette tip, a washing buffer (300) is dispensed into the well (210) in order to wash the pellet (240) and aspirated again in FIG. 2C. The step of aspirating and dispensing may be repeated several times in order to improve efficiency of the washing procedure. In some embodiments, the arrangement can be adjusted to the incubation position (1000), such that the particles (230) are resuspended, and their surface is better accessible for the washing agent (300). In such embodiments, the multiwell plate (200) and the magnets (411, 412) would be readjusted to the lower peripheral collection position (1002) shown in FIG. 2D, while without resuspension this position (1002) would remain unchanged throughout the washing process of FIG. 2A-D. Surprisingly, the inventors have found that the washing procedure can be more efficient this way, such that in some embodiments the washing procedure of the method described herein does not comprise resuspension of the magnetic particles (230), but washing of the intact pellet (240).

Figure 3:
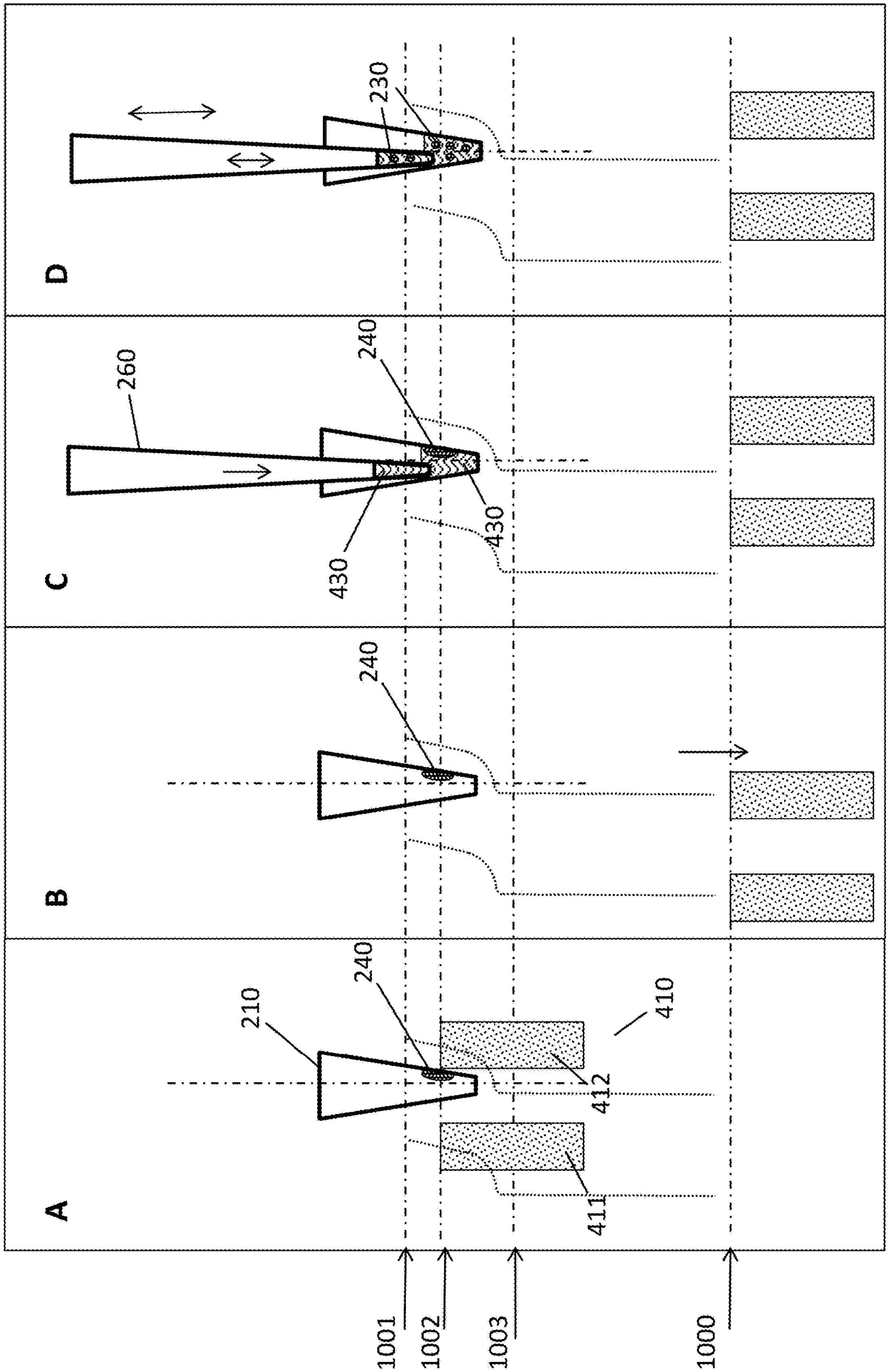
FIG. 3 features the steps of the method described herein for eluting the analyte from the magnetic particles.
Figure 3:
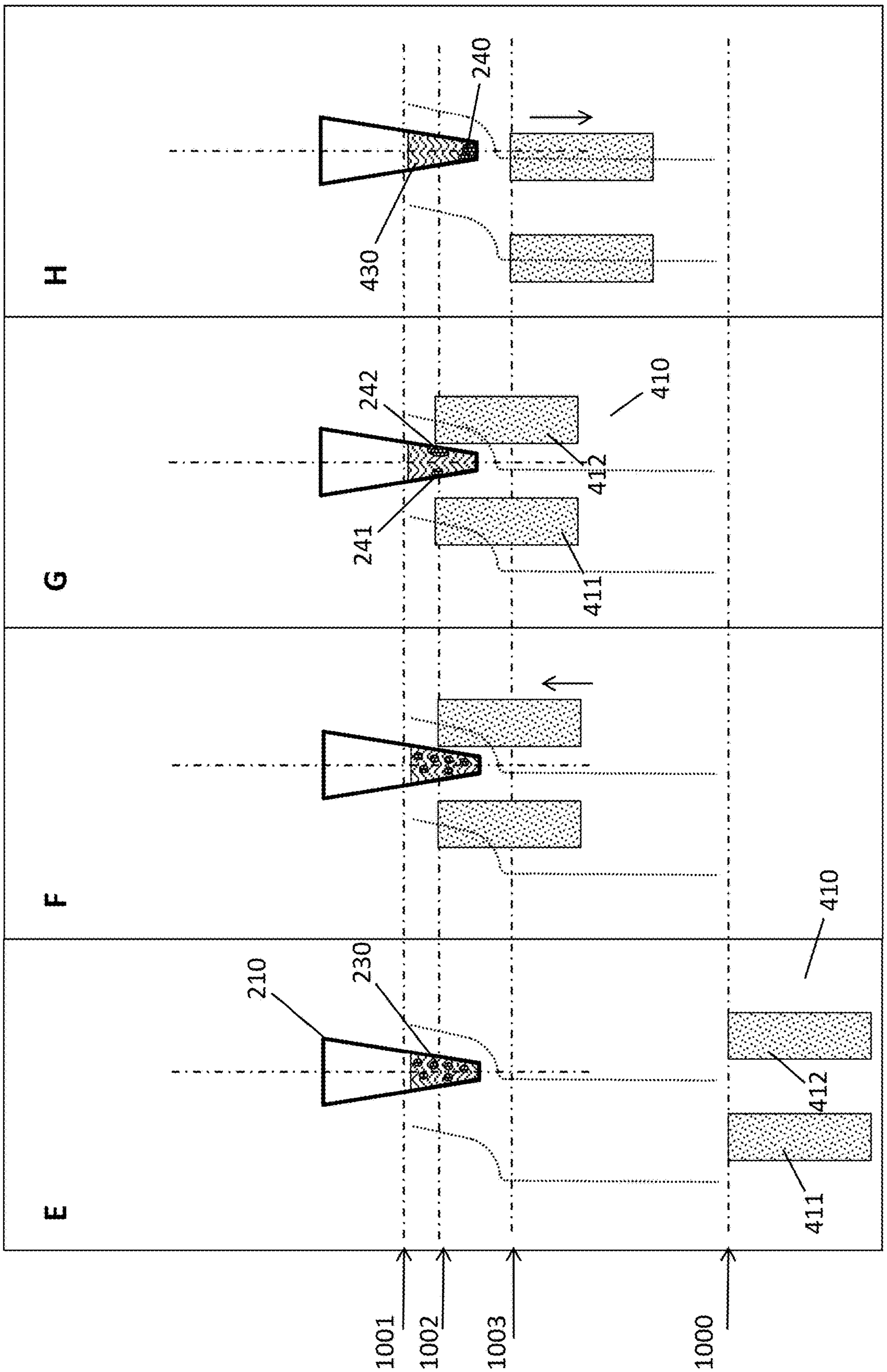
Figure 3:
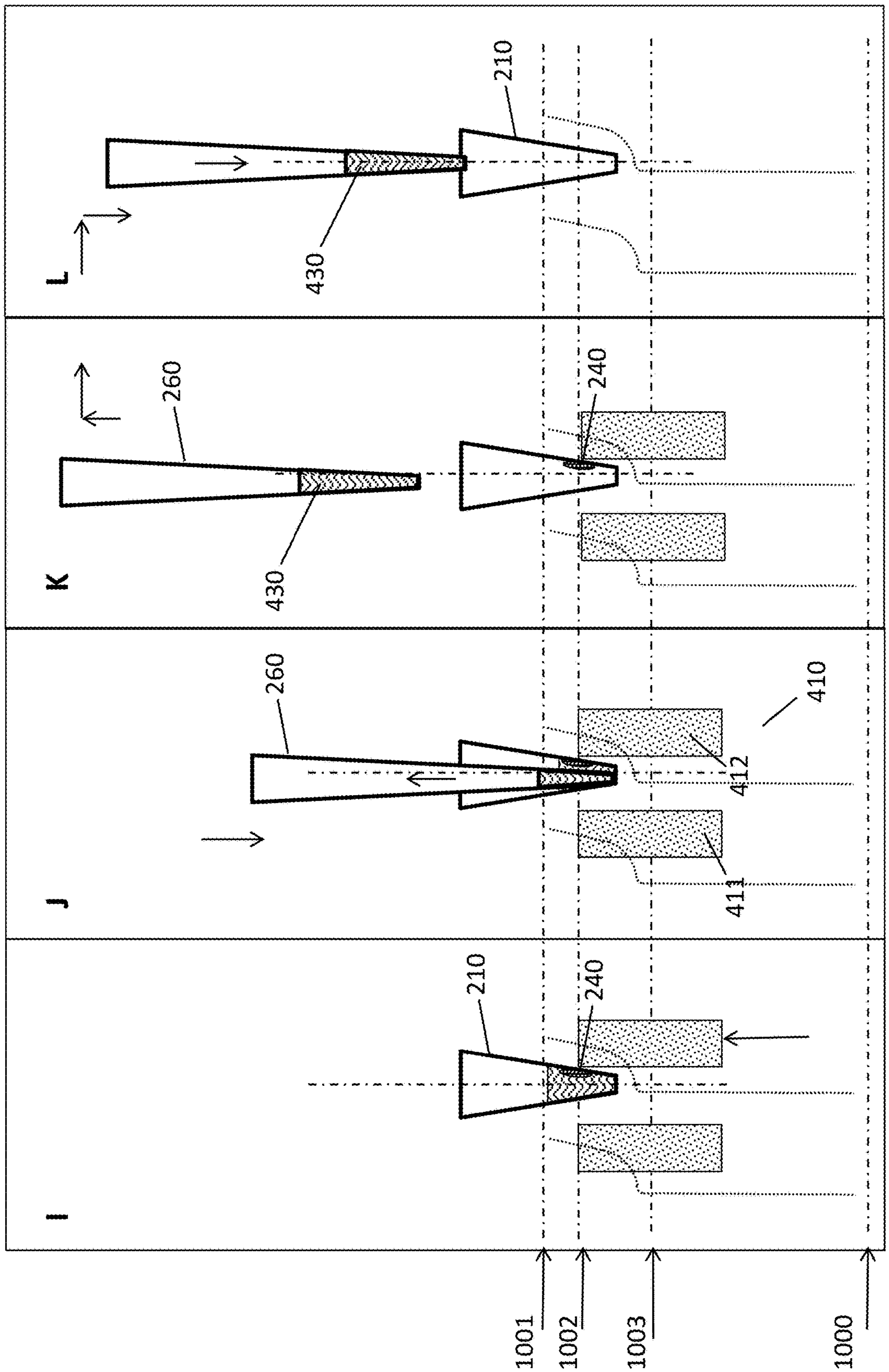

Turning to FIG. 3, the sequence depicted in FIG. 3A-L illustrates an embodiment of the elution steps of the method described herein.

The well (210) with the pellet (240) depicted in FIG. 3A in the lower peripheral collection position (1002) may, for instance, be the result of the incubation shown in FIG. 1A-K, or of the washing displayed in FIG. 2A-D. In some embodiments, the pellet (240) has been dried such as by conventional air-drying, or application of heat, or the like.

The magnets (411, 412) are moved downwards in relation to the well (210) to reach the incubation position (1000), such that there is no significant magnetic field gradient acting on the pellet (240) attached to the inner well wall, as shown in FIG. 3B.

FIG. 3C depicts the introduction of a pipette tip (260) into the well (210), wherein an elution buffer is added to the well (210). While the pellet (240) and the pipette tip (260) are laterally spaced apart from each other, this is not a necessity in this case, as the beads (230) are subsequently resuspended by aspiration and dispensing as displayed in FIG. 3D.

The resuspension is concluded in FIG. 3E, with the arrangement still in the incubation position (1000), followed by a movement of the magnets (411, 412) relative to the well (210) to reach the lower peripheral collection position (1002) in FIG. 3F. The resulting attraction of the magnetic particles (230) to the inner wall of the well (210) can be seen in FIG. 3G.

In the embodiment depicted here, a pellet unification is achieved by movement of the magnets (411, 412) relative to the well (210) to the central collection position (1003) in FIG. 3H, and subsequently back upwards to reach the lower peripheral collection position (1002) again. As described hereinabove, this step may also be omitted in some embodiments.

A pipette tip (260) is now introduced into the well (210) in FIG. 3J, wherein the lateral positions of the pellet (240) and the pipette tip (260) are spaced apart sufficiently for the pellet (240) and the pipette tip (260) to avoid a physical interaction between one another sufficient to disturb the pellet (240). Having concluded the aspiration of the maximum possible amount of the eluate, the pipette tip is removed from the well (210) in FIG. 3K, while the pellet (240) is retained by the magnetic force exerted by the magnets (411, 412) in the lower peripheral collection position (1002), in the depicted case especially the magnetic field gradient invoked by magnet (412). A different, fresh vessel (270) is exploited in FIG. 3L to receive the analyte-containing eluate.

The arrangement of multiwell plate (200) and magnetic separation plate (400) in s magnetic separation device (500) is shown in the different perspective views of FIG. 4.

Figure 4A:
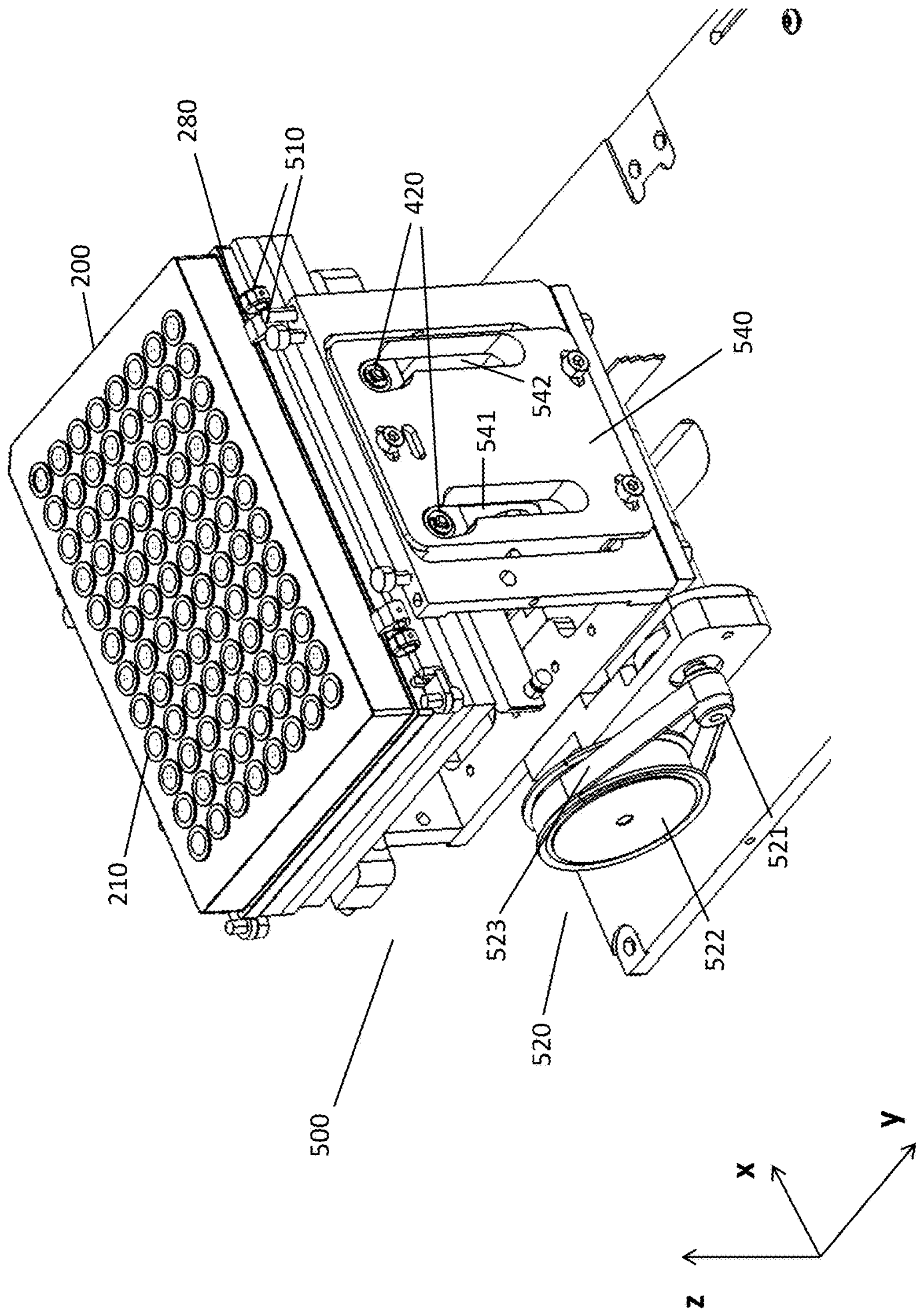
FIG. 4A illustrates a multi-well plate mounted on a socket of a magnetic separation device.

FIG. 4A represents a multiwell plate (200) mounted on a socket (560, shown in FIG. 4F) of the magnetic separation device (500). In the depicted embodiment, the multiwell plate (200) is a standard SBS 96-well plate. Such plates are well-established in the art and commercially available from a variety of suppliers. The magnets (410) of the magnetic separation plate (400) are concealed by the multiwell plate (200).

The multiwell plate (200) is fastened to the socket (560), in the shown embodiment, by pressing downholders (510) of the socket (560) onto the lip (280) of the multiwell plate (200).

An actuator (520) is used to confer movability of the magnetic separation plate (400) in vertical direction (z-axis). In the depicted embodiment, the actuator (520) comprises a drive wheel (521) and a driven gear (522) connected by a drive belt (523). The latter, in the shown embodiment larger wheel (522) is connected to a lifting arm (524, concealed) via a drive axis (525, concealed). This arrangement confers vertical movability of the magnetic separation plate (400), as represented by the z-axis in the lower left corner of the drawing. Lateral movability, in direction of the x-axis, is achieved by mounting the magnetic separation plate (400) on a slide (530). The actual movement of the magnetic separation plate (400) along the x-axis is brought about indirectly by an interaction between dedicated mounts (420) of the magnetic separation plate (400) and cut-outs (541, 542) in a guiding screen (540), wherein the cut-outs (541, 542) serve as guiding rails for the dedicated mounts (420) and thus ultimately the magnetic separation plate (400). In connection with the curved dotted lines depicted in FIGS. 1 to 3, these guiding rails (541, 542) define the vertical and lateral movement of the magnetic separation plate (400) and thus the magnets (400) in relation to the wells (210) of the multiwell plate (200). Hence, the lateral movement of the magnets (400) in this embodiment is a passive one, however, a second actuator (not shown) immediately driving a lateral movement is also possible. In this embodiment, the lateral movement is restricted to the x-axis, while a movement in the y-axis is not necessary.

As this movement advantageously reduces complexity, for instance, of the required hardware, in some embodiments of the method disclosed herein the lateral movement of the multiwell plate (200) and/or the magnetic separation plate (400) relatively to each other is one-dimensional, meaning along only one of an x-axis or a y-axis (both axes being horizontal).

Figure 4B:
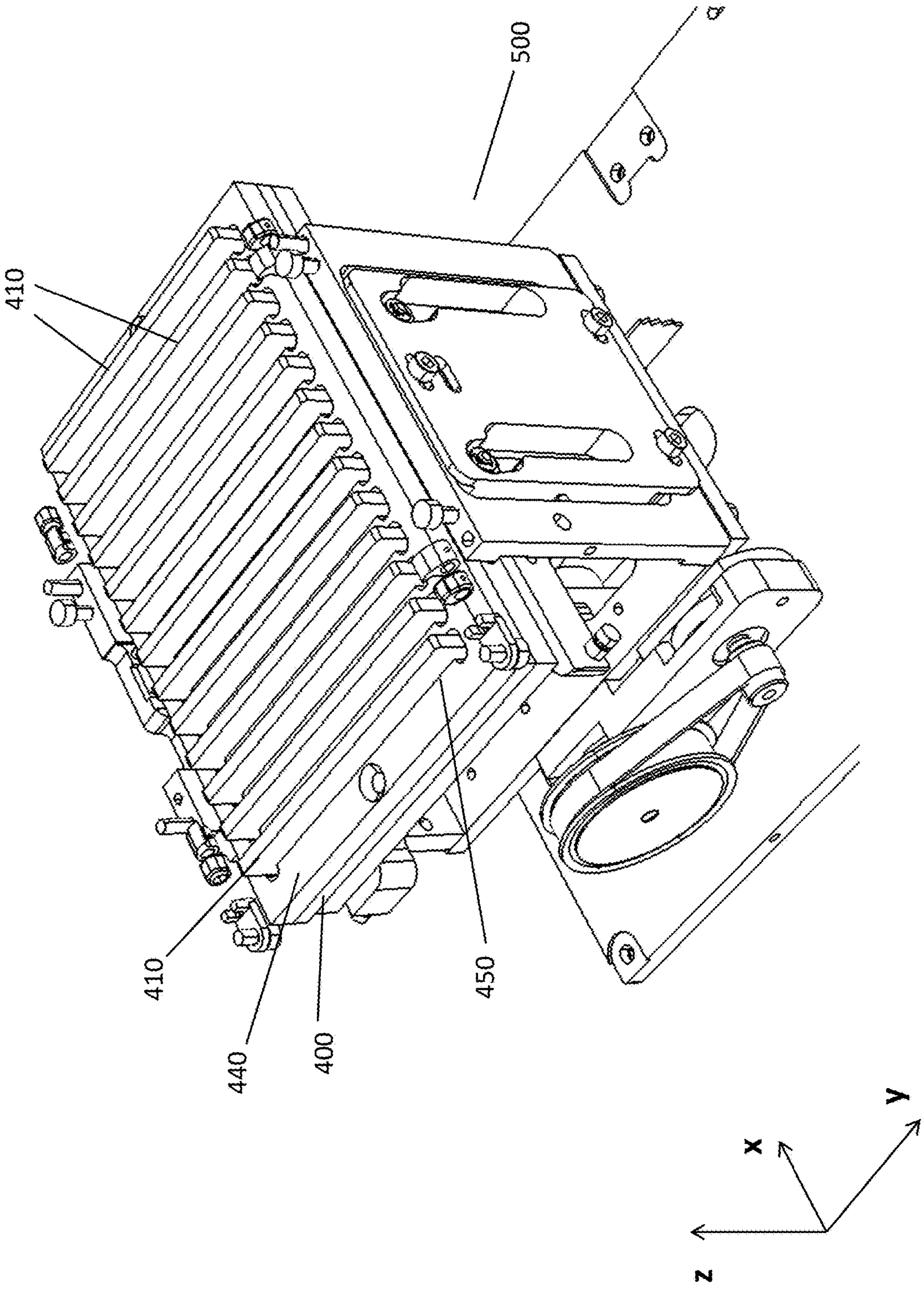
FIG. 4B shows a perspective view of the same embodiment as in FIG. 4A with a disassembled multi-well plate, such that the magnetic separation plate is visible.

FIG. 4B shows a perspective view of the same embodiment as in FIG. 4A with a disassembled multiwell plate (200, not shown), such that the magnetic separation plate (400) is visible. The magnets (410) in this embodiment are shaped as bars with a vertical polarity, i.e., the upper face of a bar may be a north pole, while the lower face may be a south pole. In some embodiments, the polarity may alternate between neighboring magnetic bars (410), or it can be the same throughout the arrangement on the magnetic separation plate (400). An alternating polarity can contribute to improved homogeneity of the magnetic field. The magnets (410) are arranged in a geometrically predetermined manner such that they are located between corresponding columns of wells (210) of the multiwell plate (200). In a cross-sectional side view, one well (210) between two magnets (410) would correspond to the depiction of FIGS. 1 to 3, where the essentially cuboidal magnetic bars (410) would appear rectangular-shaped (411, 412). The lateral and vertical movements of the magnets (410) and the well (210) in relation to each other can be described correspondingly. The present drawing shows an embodiment in which the magnets (410) protrude from recesses (450) in a mask (440), while the foot of the magnetic separation plate (400) is located below the mask (440). Hence, the mask (440) contributes to a stable orientation of the magnets (410) on the magnetic separation plate (400).

Figure 4C:
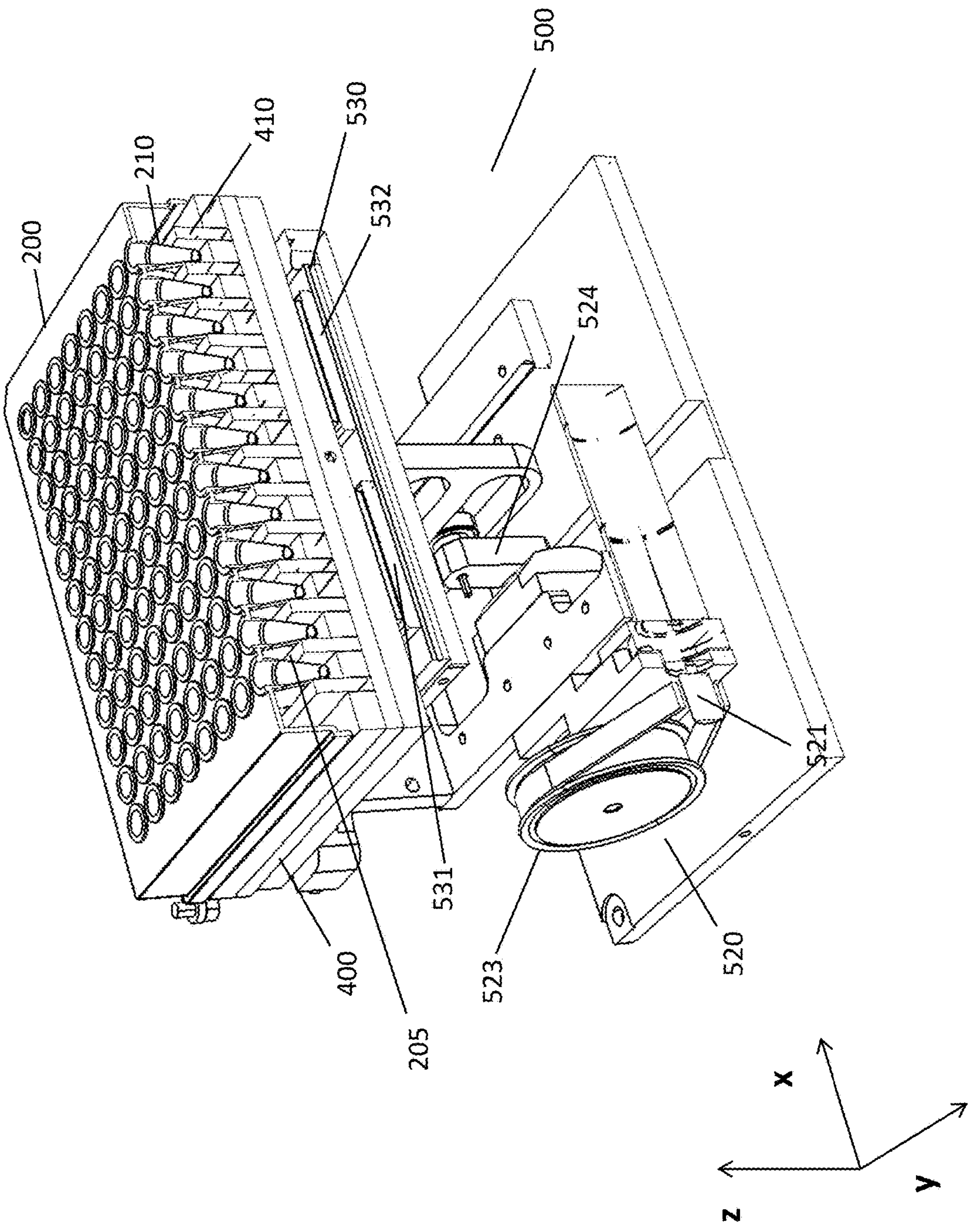
FIG. 4C provides an alternative perspective cross-sectional view where the front faces of the multi-well plate and the magnetic separation plate are cut to reveal the inside of a row of wells and a cross-section of the magnets.
Figure 4D:
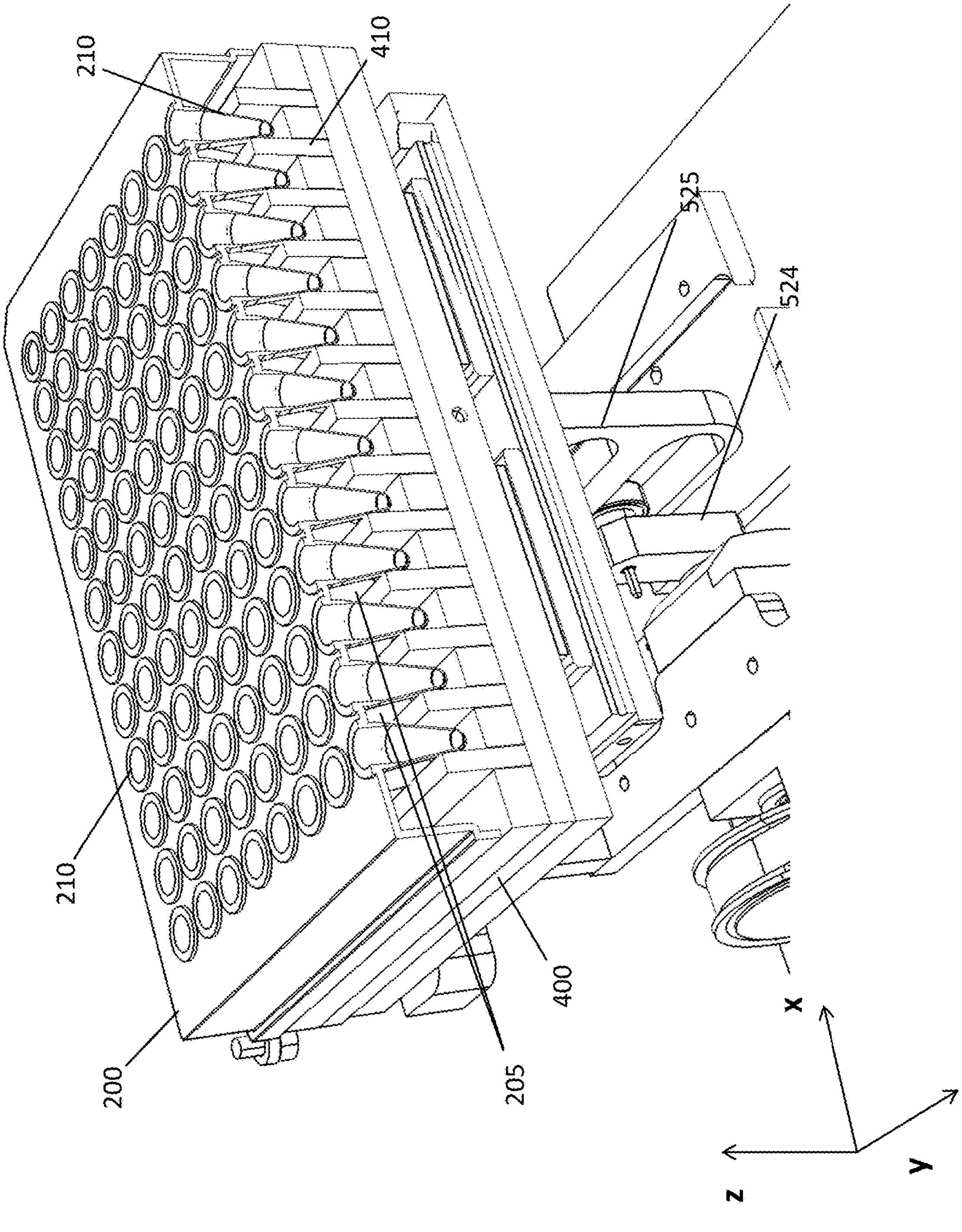
FIG. 4D provides an alternative perspective cross-sectional view where the front faces of the multi-well plate and the magnetic separation plate are cut to reveal the inside of a row of wells and a cross-section of the magnets.

The relation between the depictions of FIGS. 1 to 3 and FIG. 4, respectively, is illustrated in more detail by the perspective cross-sectional views in FIG. 4C and FIG. 4D. The front faces of the multiwell plate (200) and the magnetic separation plate (400) are cut to reveal the inside of a row of wells (210) and a cross-section of the magnets (410). This depiction also shows the slide (530) with guiding rails (531, 532), conferring movability of the magnetic separation plate (400) along the x-axis. Further visible in this cross-section is the drive wheel (521) of the actuator (520), as well as the lifting arm (524) bringing about vertical movement by transferring its rotation via a rail (525) to the slide (530) and thus the magnetic separation plate (400). It can also be seen how the magnets (410) are inserted into the corresponding recesses (205) of the multiwell plate (200) in positions corresponding to the predetermined geometrical arrangement of the plurality of magnets (410).

Figure 4E:
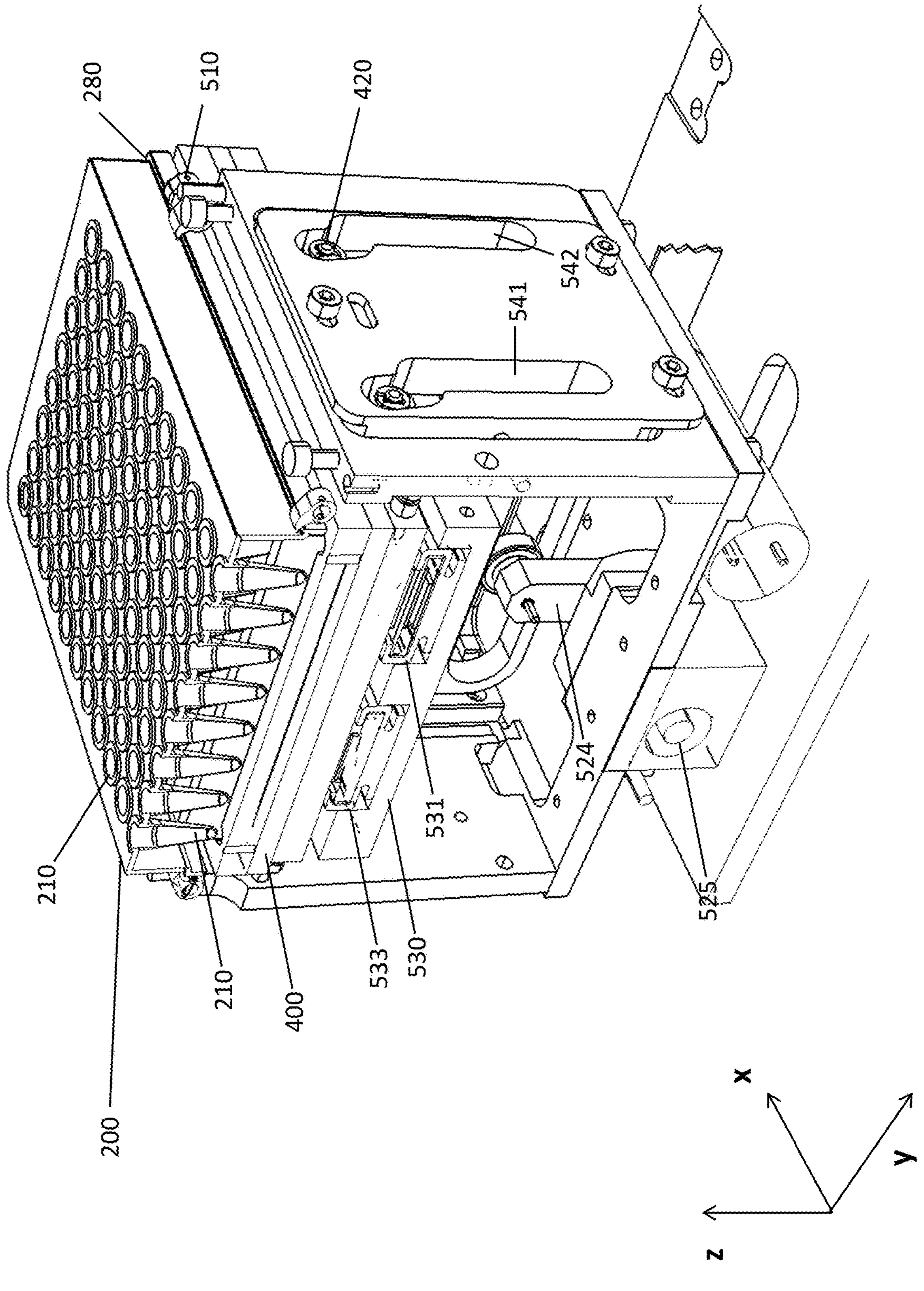
FIG. 4E provides a perspective view of a cross-section along a column of the multi-well plate through the center axes of the wells.

FIG. 4E provides a perspective view of a cross-section along a column of the multiwell plate (200) through the center axes of the wells (210). This perspective allows further insight into the structure of the guiding rails (531, 533) of the slide (530), as well as the drive axis (525) transferring kinetic energy from the larger wheel (522) to the lifting arm (524).

Figure 4F:
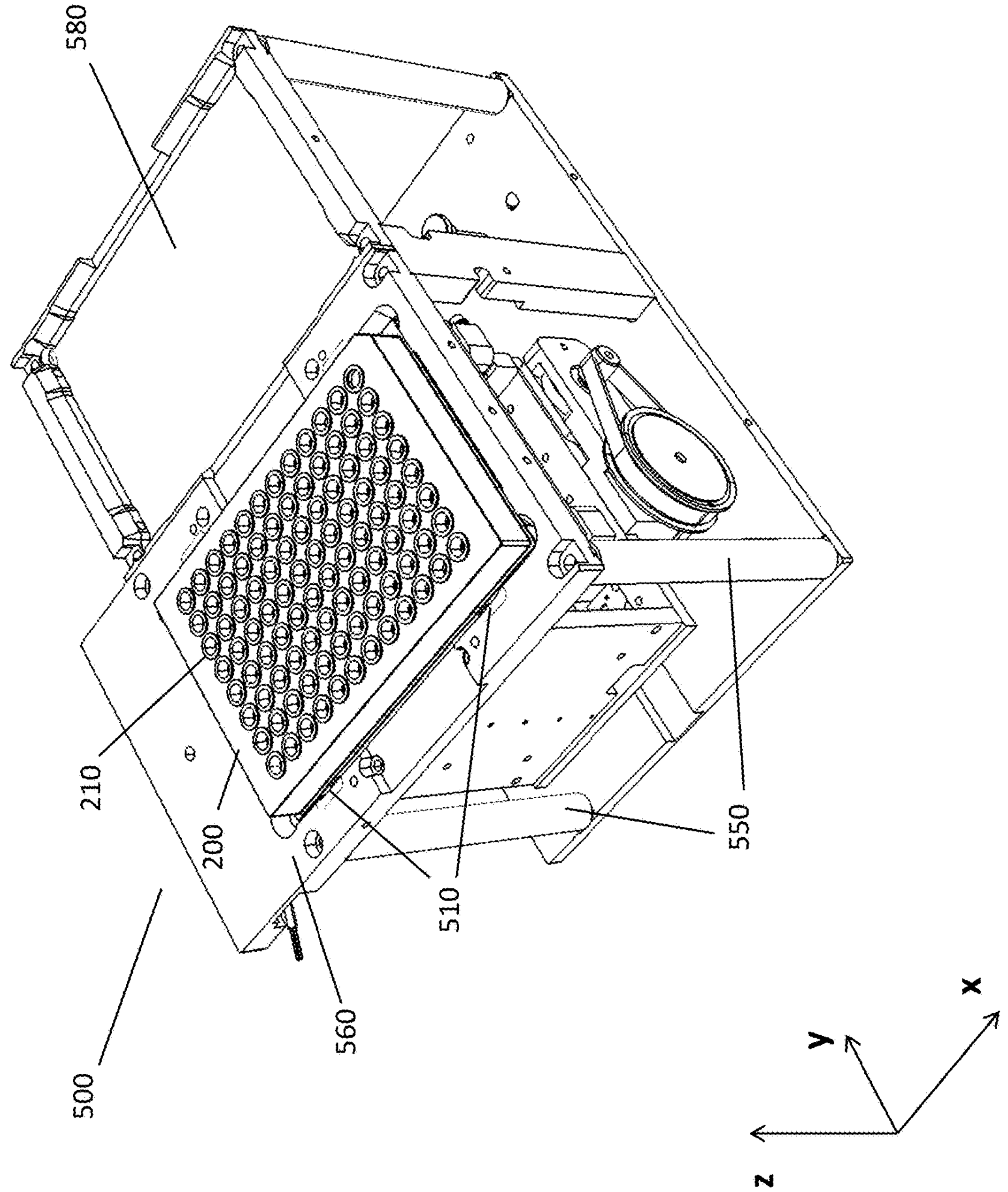
FIG. 4F displays several elements not shown in the preceding figures for the sake of clarity. In this perspective view from a different angle, the socket of the magnetic separation device holding the multi-well plate is visible along with columns fixing it to a bottom plate.

FIG. 4F displays a number of elements not shown in the preceding figures for the sake of clarity. In this perspective view from a different angle, the socket (560) of the magnetic separation device (500) holding the multiwell plate (200) is visible along with columns (550) fixing it to a bottom plate (570). This depiction also includes a parking tray (580) in which the multiwell plate (200) may be temporarily stored before or after processing above the magnetic separation plate (400). The downholders (510) of the socket (560) are partially concealed by the upper face of the socket (560).

Figure 4G:
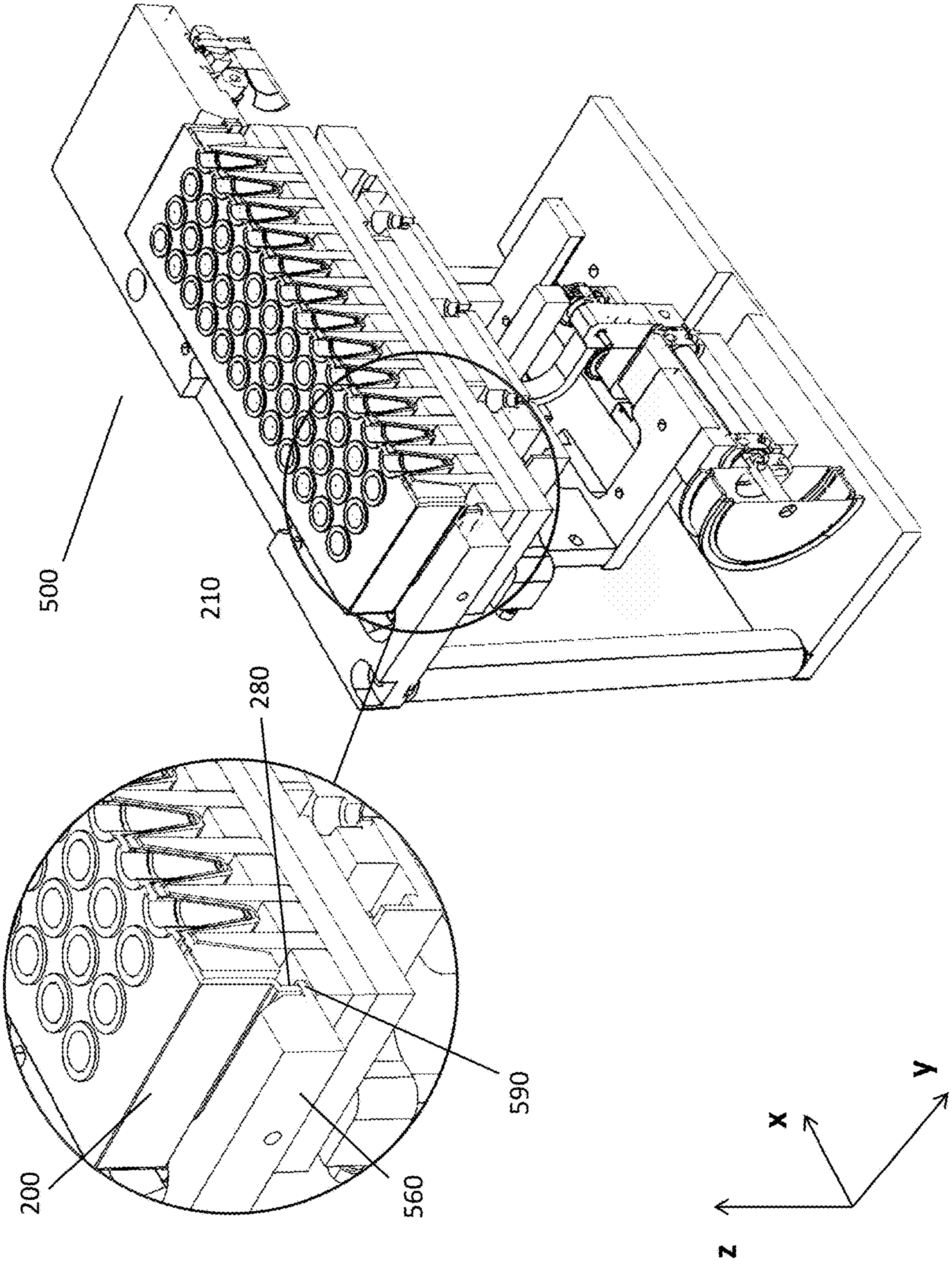
FIG. 4G illustrates the interaction of multi-well plate and socket.

FIG. 4G gives a more detailed view of the interaction of multiwell plate (200) and socket (560), especially in the zoomed view in the upper left corner of the figure. As can be seen, the lip (280) of the multiwell plate (200) is fit into frame-like protrusion (590) of the socket (560) and in addition clamped by the downholders (510) of the socket (560) as described above.

ADDITIONAL EMBODIMENTS

Additional Embodiment 1

A method for isolating a biological target material from a liquid sample, the method comprising the steps of:

a. providing a multiwell plate (200) having a plurality of wells (210) with an open top and a closed bottom, wherein at least a part of the plurality of wells (210) comprises the liquid sample (220) and a suspension of magnetic particles (230) with a binding surface in a first liquid volume, the multiwell plate (200) further comprising recesses (205) in positions corresponding to a predetermined geometrical arrangement of a plurality of magnets (410) of a magnetic separation plate (400);

b. incubating the liquid sample (220) and the magnetic particles (230), using conditions under which the biological target material binds to the surface of the magnetic particles (230), in an incubation position (1001) of multiwell plate (200) and magnetic separation plate (400) with sufficient distance to each other such that the magnets (410) of the magnetic separation plate (400) do not cause a magnetic field gradient within the wells (210) of the multiwell plate (200) with sufficient strength to move the magnetic particles (230);

c. introducing the magnets (410) of the magnetic separation plate (400) into the recesses (205) of the multiwell plate to reach an upper peripheral collection position (1002), wherein each magnet (410) is in sufficient proximity to the outside wall of a corresponding well (210) to impose a magnetic field gradient on the inner space of said well, thereby forming a pellet (240) of magnetic particles (230) at the inner wall of the respective well (210) at a first specific height;

d. moving the multiwell plate (200) and/or the magnetic separation plate (400) relatively to each other to reach a lower peripheral collection position (1003), wherein the movement is carried out in a vertical and lateral manner such that the pellet (240) is caused by the magnetic field gradient to move alongside the inner wall in the direction from top to bottom of the respective well (210) to reach a second specific height;

e. introducing a plurality of pipette tips (260) of a pipettor into the wells (210) of the multiwell plate (200) and down into sufficient proximity to the bottoms of the wells (210) to withdraw the maximum possible amount of liquid with the pipette tips (260), wherein the lateral positions of the pellet (240) and the pipette tips (260) are spaced apart sufficiently for the pellet (240) of magnetic particles (230) and the pipette tip (260) to avoid a physical interaction between one another sufficient to disturb the pellet (240);

f. withdrawing the liquid from the respective wells (210) while retaining the pellet (240) of magnetic particles (230) by magnetic force;

g. optionally adding a washing buffer (300) to the wells (210) for removing undesired components from the surface of the magnetic particles (230) while retaining the biological target material thereon, then withdrawing the liquid from the respective wells (210) while retaining the pellet (240) of magnetic particles (230) by magnetic force;

h. retrieving the magnets (410) of the magnetic separation plate (400) from the recesses (205) in the multiwell plate (200) to the incubation position of multiwell plate (200) and magnetic separation plate (400), and adding an elution buffer (430) to the wells (210) resulting in a second liquid volume, wherein the second liquid volume is smaller than the first liquid volume, and resuspending the magnetic particles (230) therein;

i. eluting the biological target material from the magnetic particles (230) with the elution buffer (430);

j. introducing the magnets (410) of the magnetic separation plate (400) into the recesses (205) of the multiwell plate (200) to reach the upper (1002) or lower peripheral collection position (1003), wherein each magnet (400) is in sufficient proximity to the outside wall of a corresponding well (210) to impose a magnetic field gradient on the inner space of said well (210), thereby forming a pellet (240) of magnetic particles (230) at the inner wall of the respective well (210) at the first or second specific height;

k. introducing the plurality of pipette tips (260) of the pipettor into the wells (210) of the multiwell plate (200) and down into sufficient proximity to the bottoms of the wells (210) to withdraw the maximum possible amount of liquid with the pipette tips (260), wherein the lateral positions of the pellet (240) and the pipette tips (260) are spaced apart sufficiently for the pellet (240) and the pipette tip (260) to avoid a physical interaction between one another sufficient to disturb the pellet (240);

l. withdrawing the eluate containing the isolated biological target material from the respective wells (210) while retaining the pellet (240) of magnetic particles (230) by magnetic force.

Additional Embodiment 2

The method of additional embodiment 1, wherein a plurality of pellets (241, 242) is formed in step c., and wherein step d. consists of the following sub-steps for pooling the plurality of pellets (241, 242):

I. moving the multiwell plate (200) and/or the magnetic separation plate (400) relatively to each other to reach a central collection position (1000), wherein the movement is carried out in a vertical and lateral manner such that the pellets (241, 242) are caused by the magnetic field gradient to move alongside the inner wall in the direction from top to bottom of the respective well (210) to be pooled to form a single pellet (240) at the well bottom;

II. moving the multiwell plate (200) and/or the magnetic separation plate (400) relatively to each other to reach a lower peripheral collection position (1003), wherein the movement is carried out in a vertical and lateral manner such that the pellets (241, 242) are caused by the magnetic field gradient to move alongside the inner wall in the direction from bottom to top of the respective well (210) to reach a second specific height.

Additional Embodiment 3

The method of additional embodiment 2, wherein step d. is repeated subsequently to step g. and/or step j.

Additional Embodiment 4

The method of any of the preceding additional embodiments, wherein the magnetic particles (230) have a mean diameter from 50 nm to 50 μm.

Additional Embodiment 5

The method of any of the preceding additional embodiments, wherein the magnetic particles (230) are superparamagnetic.

Additional Embodiment 6

The method of any of the preceding additional embodiments, wherein the elution volume in step h. is from 5 μl to 50 μl.

Additional Embodiment 7

The method of any of the preceding additional embodiments, wherein the lateral movement of the multiwell plate (200) and/or the magnetic separation plate (400) relative to each other is one-dimensional along a horizontal axis.

Additional Embodiment 8

The method of any of the preceding additional embodiments, wherein the vertical and lateral movement of the multiwell plate (200) and/or the magnetic separation plate (400) relative to each other is guided by a guiding screen (540) having guiding rails (541, 542), the guiding screen (540) being essentially perpendicular to the multiwell plate (200) and/or to the magnetic separation plate (400).

ADDITIONAL EMBODIMENT 9. A pre-analytical system for isolating a biological target material from a liquid sample (220), the pre-analytical system comprising the elements of:

a multiwell plate (200) having a plurality of wells (210) with an open top and a closed bottom, wherein at least a part of the plurality of wells (210) comprises the liquid sample (220) and a suspension of magnetic particles (230) with a binding surface in a first liquid volume, the multiwell plate (200) further comprising recesses (205) in positions corresponding to a predetermined geometrical arrangement of a plurality of magnets (410) of a magnetic separation plate (400);

a magnetic separation device (500) comprising a guiding screen (540) and the magnetic separation plate (400), the guiding screen (540) being essentially perpendicular to the multiwell plate (200) and/or to the magnetic separation plate (400) and having guiding rails (541, 542) for guiding a movement of the multiwell plate (200) and/or the magnetic separation plate (400) relatively to each other, wherein the movement is carried out in a vertical and lateral manner such that a pellet (240) of the magnetic particles (230) is caused by the magnetic field gradient to move alongside the inner wall of a well (210) of the multiwell plate (200).

Additional Embodiment 10

The pre-analytical system of additional embodiment 9, wherein the multiwell plate (200) has dimensions according to the standard SBS format.

Additional Embodiment 11

The pre-analytical system of any of the additional embodiments 9 or 10, wherein the magnetic separation device (500) further comprises on its upper face a frame (560) for receiving the multiwell plate (200).

Additional Embodiment 12

The pre-analytical system of additional embodiment 11, wherein the guiding screen (540) is physically connected to the frame (560) of the magnetic separation device (500).

The invention claimed is:

1. A method for isolating a biological target material from a sample, comprising:

a. associating the biological target material with magnetic particles homogeneously suspended in a liquid in at least one well of a multiwell plate, wherein the multiwell plate includes recesses in positions corresponding to a predetermined geometrical arrangement of a plurality of magnets of a magnetic separation plate, wherein the association is performed when the multiwell plate and the magnetic separation plate are in an incubation position, where when in the incubation position the plurality of magnets of the magnetic separation plate do not impose a magnetic field on the magnetic particles;

b. forming a pellet of magnetic particles on an inner wall of the at least one well of the multiwell plate by moving the plurality of magnets of the magnetic separation plate into the recesses of the multiwell plate and to first peripheral collection position, wherein the formed pellet is positioned at a first specific height along the inner wall of the at least the one well of the multiwell plate;

c. sliding the formed pellet along the inner wall from the first specific height to a second specific height, wherein the formed pellet is slid by moving the multiwell plate and/or the magnetic separation plate relatively to each other to a second peripheral collection position, wherein the relative movement of the multiwell plate and/or the magnetic separation plate to the second peripheral collection position comprises both vertical and lateral movement components;

d. withdrawing at least a portion of the liquid from the at least one well;

e. eluting the biological target material from the magnetic particles by suspending the magnetic particles in an elution buffer, wherein the magnetic particles are suspended in the elution buffer by introducing the elution buffer to the at least one well of the multiwell plate and moving the magnets to the incubation position;

f. re-forming the pellet of magnetic particles on the inner wall of the at least one well of the multiwell plate by moving the magnets of the magnetic separation plate into the recesses of the multiwell plate; and g. withdrawing the eluate including the isolated biological target material from the at least the one well of the multiwell plate.

2. The method of claim 1, wherein the at least the portion of the liquid from the at least one well is withdrawn without disturbing the formed pellet.

3. The method of claim 1, wherein the vertical and lateral movement of the multiwell plate and/or the magnetic separation plate relative to each other is guided by a guiding screen having guiding rails, the guiding screen being perpendicular to the multiwell plate and/or to the magnetic separation plate.

4. The method of claim 1, wherein the inner wall of the at least one well of the multiwell plate is a side of the at least one well.

5. The method of claim 1, wherein the inner wall of the at least one well of the multiwell plate is a bottom of the at least one well.

6. The method of claim 1, wherein the pellet is re-formed by moving the magnets to the first peripheral collection position.

7. The method of claim 1, wherein the pellet is re-formed by moving the magnets to the second peripheral collection position.

8. The method of claim 1, further comprising washing the formed pellet.

9. The method of claim 1, wherein the magnetic separation plate is coupled to at least one actuator.

10. The method of claim 1, wherein the magnetic separation plate is coupled to a slide.

11. A method of sliding a pellet along an inner wall of at least one well of a multiwell plate, comprising:

a. obtaining a pellet of magnetic particles positioned on the inner wall of the at least one well of the multiwell plate at a first specific height, wherein the multiwell plate includes recesses in positions corresponding to a predetermined geometrical arrangement of a plurality of magnets of a magnetic separation plate, wherein the plurality of magnets of the magnetic separation plate may be moved within the recesses; and b. sliding the formed pellet along the inner wall of the at least one well of the multiwell plate from the first specific height to a second specific height, wherein the formed pellet is slid by moving the multiwell plate and/or the magnetic separation plate relatively to each other from a first position to a second position within the recesses, wherein the relative movement of the multiwell plate and/or the magnetic separation plate to second position comprises both vertical and lateral movement components, wherein the lateral movement component comprises moving (i) at least a first magnet of the plurality of magnets toward the at least one well of the multiwell plate, and (ii) at least a second magnet of the plurality of magnets away from the at least the one well of the multiwell plate.

12. The method of claim 11, wherein the second specific height is between the first specific height and the bottom of the at least one well of the multiwell plate.

13. The method of claim 11, further comprising moving the pellet that has been slid along the inner wall to a third specific height.

14. The method of claim 11, further comprising homogeneously suspending the magnetic particles in a liquid within the at least one well of the multiwell plate.

15. A pre-analytical system for isolating a biological target material from a liquid sample, comprising:

a multiwell plate having a plurality of wells with an open top and a closed bottom, the multiwell plate further comprising one or more recesses in positions corresponding to a predetermined geometrical arrangement of a plurality of magnets of a magnetic separation plate; and a magnetic separation device comprising a guiding screen and the magnetic separation plate, wherein the guiding screen is perpendicular to the multiwell plate and/or to the magnetic separation plate and includes one or more guiding rails adapted to move the multiwell plate and/or the magnetic separation plate relative to each other in a combined vertical and lateral manner; wherein the magnetic separation device is coupled to both an actuator and a slide.

16. The pre-analytical system of claim 15, wherein the actuator comprises a drive wheel and a drive gear connected by a drive belt.

17. The pre-analytical system of claim 15, wherein the multiwell plate has dimensions according to the standard SBS format.

18. The pre-analytical system of claim 15, wherein the magnetic separation device further comprises on its upper face a frame for receiving the multiwell plate.

* * * * *